US012807255B2

(12) United States Patent
Nishiyama

(10) Patent No.: US 12,807,255 B2
(45) Date of Patent: Nov. 24, 2026

(54) STRADDLE-TYPE VEHICLE

(71) Applicant: KAWASAKI MOTORS, LTD., Akashi (JP)

(72) Inventor: Takashi Nishiyama, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 609 days.

(21) Appl. No.: 18/198,834

(22) Filed: May 17, 2023

(65) Prior Publication Data

US 2023/0373582 A1 Nov. 23, 2023

(30) Foreign Application Priority Data

May 19, 2022 (JP) ................................ 2022-082538

(51) Int. Cl.

| | |
|---|---|
| ***B62J 9/10*** | (2020.01) |
| ***B62J 43/16*** | (2020.01) |
| ***B62J 43/20*** | (2020.01) |
| ***H01M 50/249*** | (2021.01) |
| ***H01M 50/271*** | (2021.01) |

(52) U.S. Cl.

CPC ................ *B62J 9/10* (2020.02); *B62J 43/16* (2020.02); *B62J 43/20* (2020.02); *H01M 50/249* (2021.01); *H01M 50/271* (2021.01); *H01M 2220/20* (2013.01)

(58) Field of Classification Search

CPC ......... B62J 1/00; B62J 9/10; B62J 9/18; B62J 9/30; B62J 43/16; B62J 43/20; B62J 43/23; B62J 43/28; B60K 1/04; B60K 2001/0466; B60K 2204/00; B60L 50/66; B60L 53/80; B60L 2200/12; H01M 50/249; H01M 50/262; H01M 50/271; H01M 2220/20

USPC .......................................................... 180/219

See application file for complete search history.

(56) References Cited

U.S. PATENT DOCUMENTS

2013/0270026 A1* 10/2013 Matsuda ................. B62M 7/02 180/220

2016/0280306 A1 9/2016 Miyashiro et al.

FOREIGN PATENT DOCUMENTS

| | | | |
|---|---|---|---|
| CN | 204110261 | U | 1/2015 |
| CN | 212473759 | U | 2/2021 |
| EP | 4279366 | A1 | 11/2023 |
| JP | H04-039183 | A | 2/1992 |
| JP | H0439183 | A * | 2/1992 |
| JP | H05-330464 | A | 12/1993 |
| JP | 3065331 | B2 | 7/2000 |
| JP | 2013-023046 | A | 2/2013 |
| WO | 2015-068753 | A1 | 11/2014 |

* cited by examiner

*Primary Examiner* — Kevin Hurley

*Assistant Examiner* — Felicia L. Brittman-Alabi

(74) *Attorney, Agent, or Firm* — PROCOPIO, CORY, HARGREAVES & SAVITCH LLP

(57) ABSTRACT

There is provided a straddle-type vehicle including: an accommodation space configured to accommodate an accommodation object; a seat disposed behind the accommodation space in a front-rear direction and on which a rider straddles; a hinge shaft disposed above and in front of a front end portion of the seat and extending in a left-right direction; and a cover body pivotable about the hinge shaft between an open position where the accommodation space is opened upward and a closed position where the accommodation space is covered from above.

14 Claims, 14 Drawing Sheets

STRADDLE-TYPE VEHICLE

CROSS-REFERENCE TO RELATED APPLICATIONS

This application is based on and claims priority under 35 USC 119 from Japanese Patent Application No. 2022-082538 filed on May 19, 2022, the contents of which are incorporated herein by reference.

TECHNICAL FIELD

The present disclosure relates to a straddle-type vehicle including an accommodation space for accommodating an accommodation object.

BACKGROUND ART

A straddle-type vehicle is known in which an accommodation space for accommodating an accommodation object is formed. For example, FIG. 2 of WO2015-068753A1 discloses a straddle-type vehicle including a battery case that can accommodate a battery pack as an accommodation object and from which the battery pack can be taken out. An opening of the battery case is covered with a case cover that is rotatable between a closed position and an open position about a shaft of a rear portion of the case cover. A seat is disposed above the case cover. To remove the battery pack, it is necessary to remove the seat, and the workability is low.

A straddle-type vehicle capable of facilitating an operation of accommodating and taking out an accommodation object such as a battery pack is desired.

SUMMARY OF INVENTION

Accordingly, the present disclosure provides a straddle-type vehicle capable of facilitating an operation of accommodating and taking out an accommodation object.

According to an illustrative aspect of the present disclosure, a straddle-type vehicle includes: an accommodation space configured to accommodate an accommodation object; a seat disposed behind the accommodation space in a front-rear direction and on which a rider straddles; a hinge shaft disposed above and in front of a front end portion of the seat and extending in a left-right direction; and a cover body pivotable about the hinge shaft between an open position where the accommodation space is opened upward and a closed position where the accommodation space is covered from above.

According to the present disclosure, it is possible to provide a straddle-type vehicle capable of facilitating an operation of accommodating and taking out an accommodation object.

DESCRIPTION OF EMBODIMENTS

Hereinafter, embodiments will be described with reference to the drawings.

First Embodiment

Overall Configuration

Figure 1:
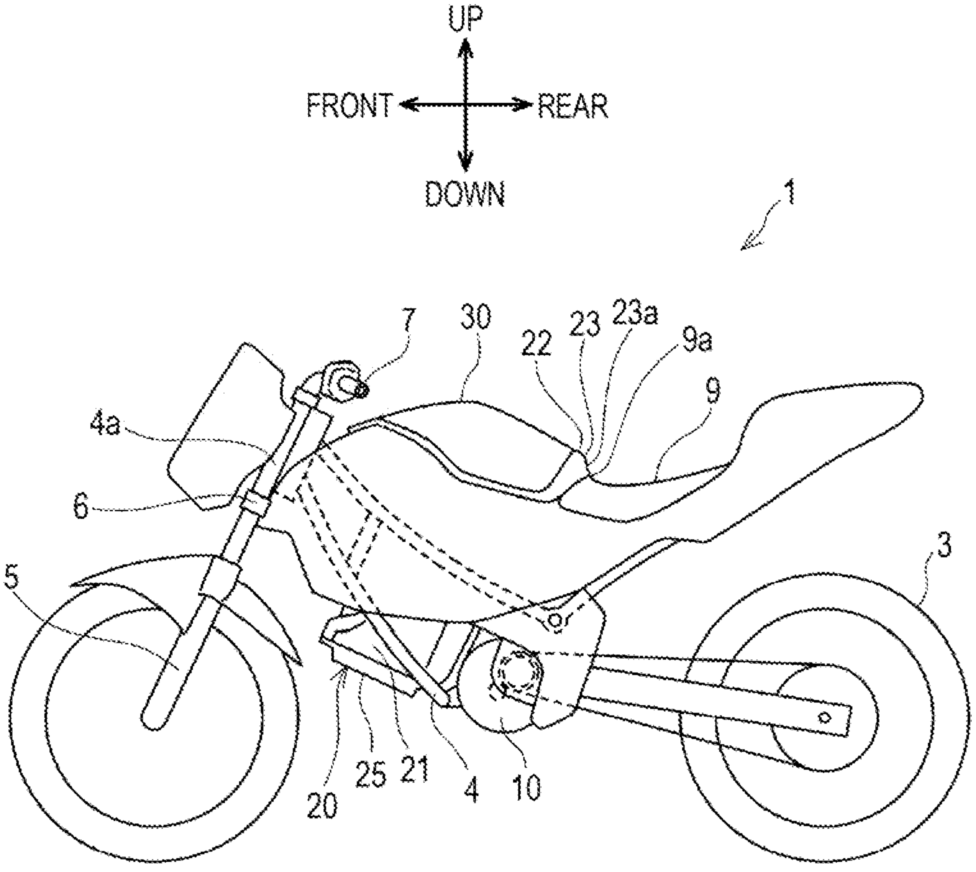
FIG. 1 is a side view of a motorcycle according to a first embodiment.
Figure 2:
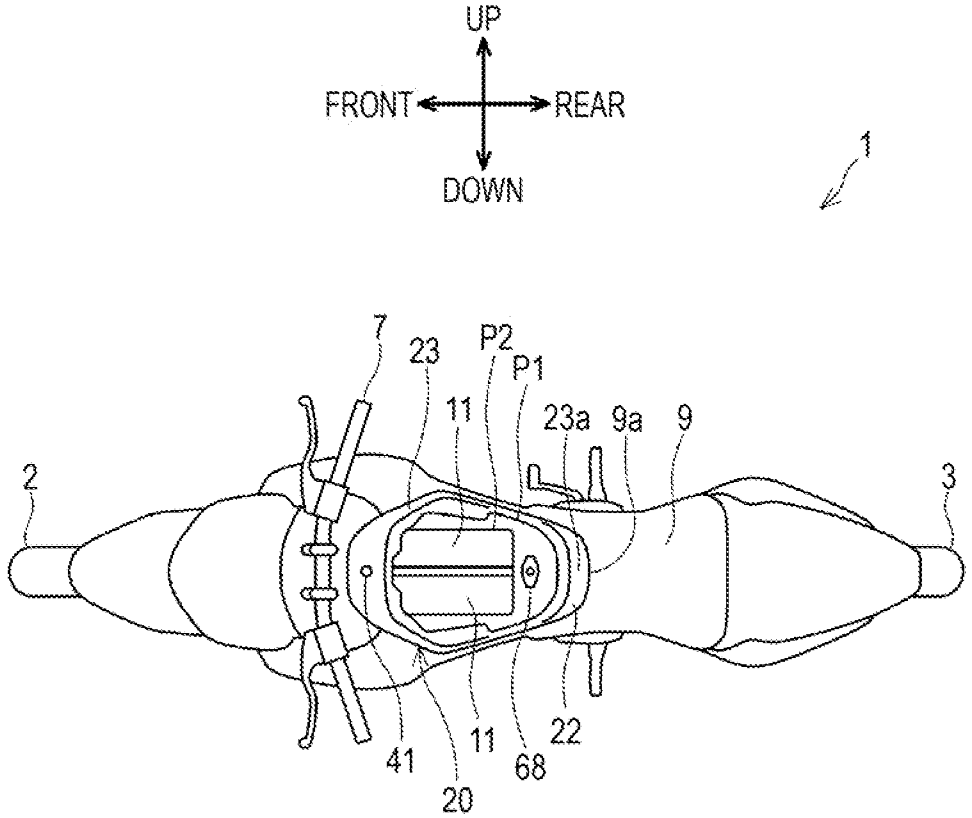
FIG. 2 is a top view of the motorcycle shown in FIG. 1.

FIG. 1 is a side view of a motorcycle 1 according to a first embodiment. FIG. 2 is a top view of the motorcycle 1 shown in FIG. 1. In FIG. 2, components such as an outer cover 30, a casing 70, and an inner cover 51, which will be described later, are omitted. As shown in FIG. 1, the motorcycle 1 is an example of a straddle-type vehicle on which a rider straddles. In the following description, a front-rear direction corresponds to a vehicle length direction, and a left-right direction corresponds to a vehicle width direction with reference to directions viewed from the rider of the motorcycle 1.

The motorcycle 1 includes a front wheel 2, a rear wheel 3, a vehicle body frame 4, a front suspension 5 that connects the front wheel 2 to a front portion of the vehicle body frame 4, and a rear suspension (not shown) that connects the rear wheel 3 to a rear portion of the vehicle body frame 4. In the present embodiment, the front wheel 2 is a driven wheel, and the rear wheel 3 is a drive wheel. The front suspension 5 is coupled to brackets 6 disposed at an interval in an up-down direction. A steering shaft connected to the brackets 6 is supported by a head pipe 4_a_, which is a part of the vehicle body frame 4, so as to be angularly displaceable.

The steering shaft is provided with a handle 7 that is gripped by the rider. A seat 9 on which the rider sits is disposed behind the handle 7. The seat 9 is supported by the vehicle body frame 4.

An electric motor 10 serving as a traveling drive source and a battery case 20 are disposed between the front wheel 2 and the rear wheel 3. The electric motor 10 and the battery case 20 are supported by the vehicle body frame 4. The electric motor 10 generates a rotational driving force to be transmitted to the rear wheel 3 which is a drive wheel. The electric motor 10 is positioned below the seat 9. In addition, the electric motor 10 is positioned in front of a front end portion (hereinafter, referred to as a "seat front end portion") 9*a* of a central portion of the seat 9 in the left-right direction.

Electric power is supplied to the electric motor 10 from battery packs 11 (see FIG. 2) which are accommodation objects accommodated in the battery case 20 (corresponding to a battery support) forming an accommodation chamber. The outer cover 30 is connected to the battery case 20, and by opening and closing the outer cover 30, the battery pack 11 is detachable from the motorcycle 1.

The battery pack 11 has a substantially rectangular parallelepiped shape. In the present embodiment, as shown in FIG. 2, the battery case 20 can accommodate the two battery packs 11 such that the two battery packs 11 having the same shape are aligned in the left-right direction.

Battery Case

Figure 3:
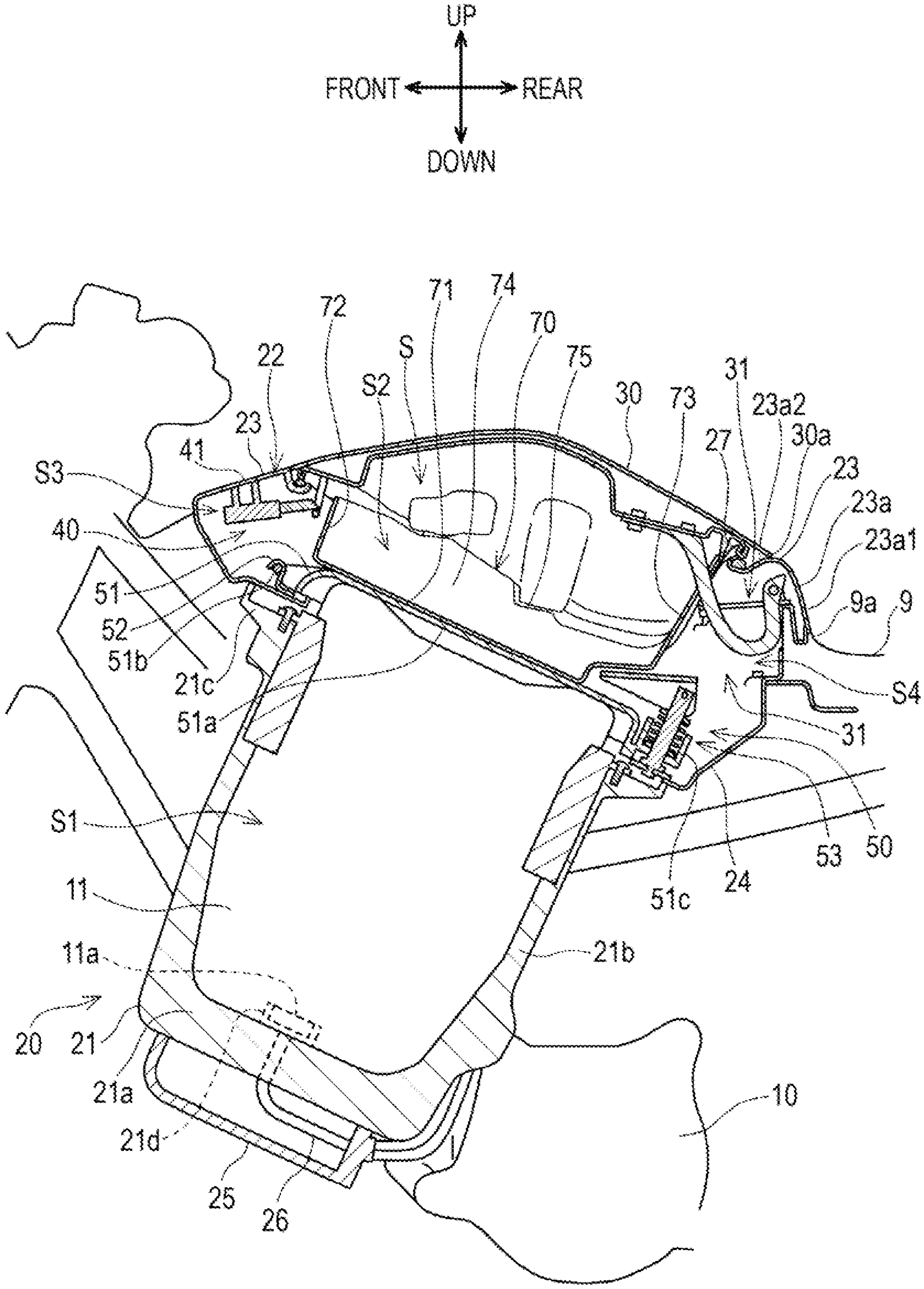
FIG. 3 is an enlarged side cross-sectional view of the vicinity of a battery case when an outer cover shown in FIG. 1 is in a closed state.
Figure 4:
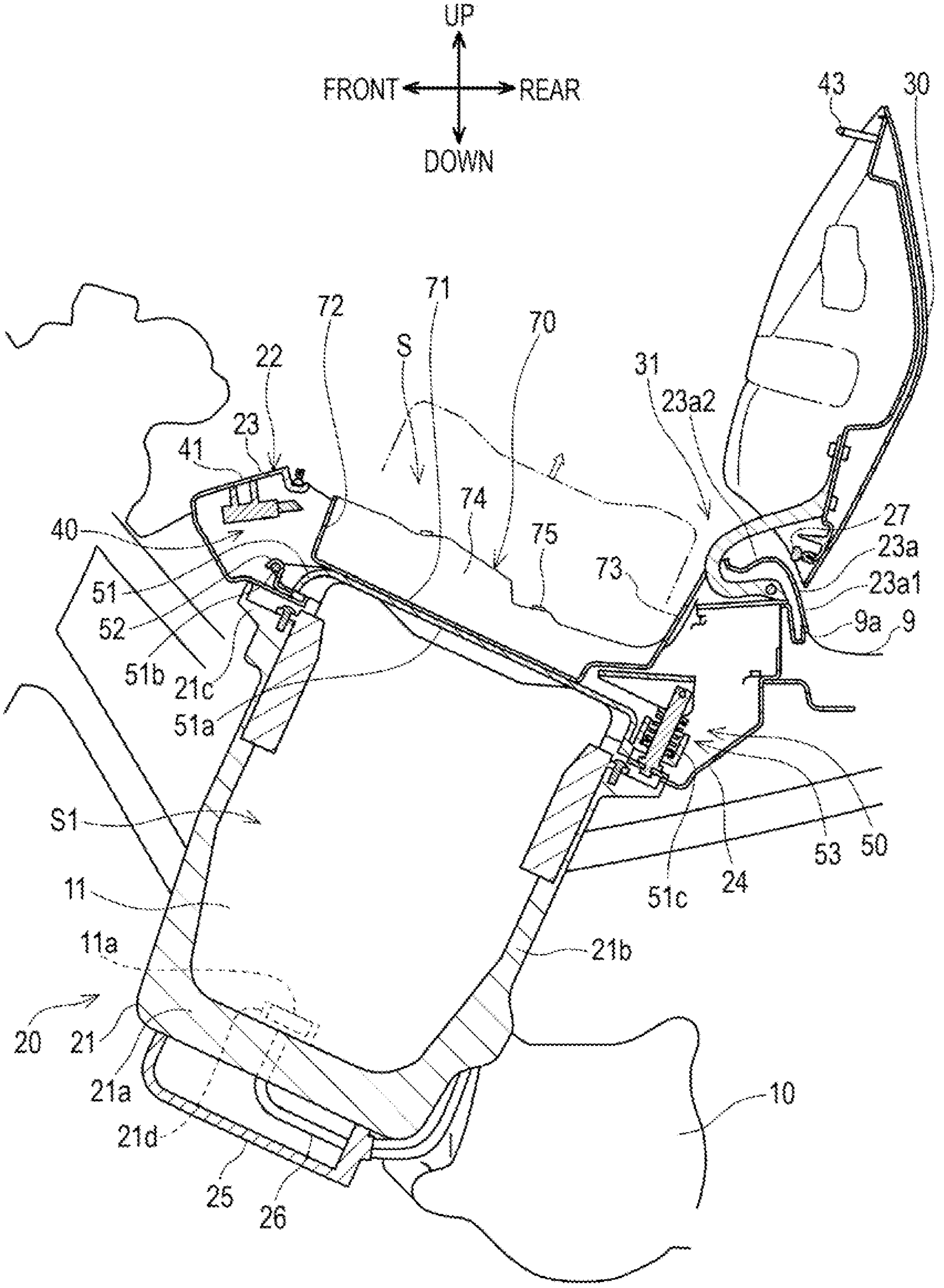
FIG. 4 is an enlarged side cross-sectional view of the vicinity of the battery case when the outer cover shown in FIG. 1 is in an open state.

FIG. 3 is an enlarged side cross-sectional view of the vicinity of the battery case 20 when the outer cover 30 is in a closed state. FIG. 4 is an enlarged side cross-sectional view of the vicinity of the battery case 20 when the outer cover 30 is in an open state. The battery case has an accommodation space S for accommodating the battery pack 11. The battery case has an opening P1 (see FIG. 2) which opens the accommodation space S, and the opening P1 can be opened or closed by the outer cover 30 which is a cover body. The opening P1 is an opening for attaching and detaching the battery pack 11. That is, the opening P1 has a size through which the battery pack 11 can pass. The opening P1 opens upward. That is, the battery pack 11 is accommodated in the battery case 20 or removed from the battery case 20 through the opening P1.

As shown in FIG. 3, the accommodation space S is surrounded by the battery case 20 and the outer cover 30 in front of the seat 9 in the front-rear direction. The battery case 20 includes a case main body 21 opened upward and a base 22 having a frame shape. The base 22 is connected to the case main body 21 so as to surround an upper end portion of the case main body 21. The base 22 includes the opening P1 (hereinafter, also referred to as an "upper opening P1") closed by the outer cover 30 and a lower opening P2 positioned below the upper opening P1. The case main body 21 and the base 22 are connected to each other such that the opening of the case main body 21 and the lower opening P2 of the base 22 are aligned.

The accommodation space S is roughly divided into a plurality of spaces by the inner cover 51 and the casing 70 disposed in the accommodation space S. For example, the inner cover 51 is disposed so as to close the opening of the case main body 21, that is, the lower opening P2 of the base 22. The inner cover 51 partitions the accommodation space S into a first space S1 surrounded by the case main body 21 and the inner cover 51 and a remaining space. The first space S1 is a space occupied by the battery pack 11 accommodated therein.

The casing 70 is mounted on an upper surface of the inner cover 51. The casing 70 has a concave shape opened upward. The casing 70 includes a bottom wall 71 that is parallel to the inner cover 51, a first partition wall 72 that rises upward from an edge portion on a front side of the bottom wall 71, and a second partition wall 73 that rises upward from an edge portion on a rear side of the bottom wall 71. A space surrounded by the inner cover 51, the base 22, and the outer cover 30 in the closed state (that is, the remaining space described above) is divided into three spaces of a second space S2, a third space S3, and a fourth space S4 by the first partition wall 72 and the second partition wall 73.

The second space S2, the third space S3, and the fourth space S4 are aligned in the front-rear direction. The second space S2 is a space sandwiched between the first partition wall 72 and the second partition wall 73 in the front-rear direction. The second space S2 is an inner space of the casing 70 and functions as a luggage accommodation space for accommodating luggage as an accommodation object. The third space S3 is a space in front of the second space S2, and the fourth space S4 is a space behind the second space S2. A lock mechanism 40, an engaging member 52, and the like, which will be described later, are disposed in the third space S3, and a hinge shaft 32, a retainer 53, and the like, which will be described later, are disposed in the fourth space S4. The third space S3 and the fourth space S4 may also be referred to as a mechanism element accommodation space in which various elements of various mechanisms are accommodated. In particular, the fourth space S4 accommodating the hinge shaft 32 may also be referred to as a shaft accommodation space.

The casing 70 includes a pair of side walls 74. One of the pair of side walls 74 connects right end portions of the first partition wall 72 and the second partition wall 73, and the other connects left end portions of the first partition wall 72 and the second partition wall 73. A flange 75 extending outward in the vehicle width direction is connected to an upper end portion of each of the side walls 74. The flange 75 abuts a part of a lower surface of the outer cover 30 in the closed state and is pressed from above. This structure prevents the casing 70 from moving up and down in the accommodation space S.

The case main body 21 has a box shape opened upward. The case main body 21 includes a rectangular bottom wall 21*a* that supports a lower surface of the battery pack 11, and peripheral walls 21*b* that rise upward from the entire periphery of the bottom wall 21*a*. The battery case 20 is inclined rearward with respect to a vertically upward direction. More specifically, the bottom wall 21*a* is inclined upward toward the front, and a rear side portion of the peripheral wall 21*b* is inclined upward toward the rear. A rear end portion of the upper opening P1 of the base 22 is positioned behind a rear end portion of an opening edge of the case main body 21. In this way, the case main body 21 is disposed such that the battery pack 11 can be obliquely inserted or removed.

The case main body 21 has the first space S1 (hereinafter, also referred to as a "battery space"). The case main body 21 includes flanges 21*c* around the opening positioned at upper ends of the peripheral walls 21*b*. The flange 21*c* is fixed to the base 22 by a fastening means such as a bolt.

A support-side connector 21*d* is disposed on an upper surface of the bottom wall 21*a*. A battery-side connector 11*a* is disposed on the lower surface of the battery pack 11. The support-side connector 21*d* and the battery-side connector 11*a* are configured such that when the battery pack 11 is guided downward toward the bottom wall 21*a* by the peripheral walls 21*b*, terminals of the support-side connector 21*d* and the battery-side connector 11*a* are brought into contact with each other to enable electrical connection.

In this way, the electrical connection between the support-side connector 21*d* and the battery-side connector 11*a* can be implemented by a simple method of guiding the battery pack

11 downward by the peripheral walls 21*b*. In other words, the contact between the terminals of the support-side connector 21*d* and the battery-side connector 11*a* can be released simply by moving the battery pack 11 upward in the battery case 20. However, since a pressing mechanism 50, which will be described later, prevents a vertical movement of the battery pack 11, the power supply from the battery pack 11 to the electric motor 10 is prevented from being cut off.

A harness cover 25 is attached to the bottom wall 21*a* of the case main body 21 from below. The harness cover 25 has a concave shape and is attached to the case main body 21 by a fastening means such as a bolt, thereby forming a harness space partially covering a harness 26 extending through the bottom wall 21*a* from the support-side connector 21*d*. Components other than the harness, such as a step-down circuit board that reduces a voltage of the power output from the battery pack 11, may be disposed in the harness space. The harness cover 25 is separate from the case main body 21, but the harness cover 25 and the case main body 21 may be integrally molded.

The frame-shaped base 22 includes an upper base frame 23 constituting an upper portion of the base 22 and a lower base frame 24 constituting a lower portion of the base 22. A lower end portion of the upper base frame 23 and an upper end portion of the lower base frame 24 are connected to each other. As shown in FIG. 2, the upper base frame 23 includes the upper opening P1 closed by the outer cover 30, and the lower base frame 24 includes the lower opening P2 positioned below the upper opening P1. The lower opening P2 is closed by the inner cover 51. A thickness direction dimension of the outer cover 30 (corresponding to the cover body) is smaller than a thickness direction dimension of the inner cover 51 (corresponding to an abutting member). That is, the outer cover 30 is thinner than the inner cover 51. As a result, the inner cover 51 can easily receive a pressing reaction force, and a weight of the outer cover 30 can be reduced.

The upper base frame 23 has an annular shape with a substantially elliptical outer shape in a top view of the motorcycle 1 (see FIG. 2 as well). The upper base frame 23 and the outer cover 30 closing the upper opening P1 of the upper base frame 23 form a dome shape opening downward. The lower base frame 24 has an annular shape with a substantially elliptical outer shape in a top view of the motorcycle 1. The lower base frame 24 and the inner cover 51 closing the lower opening P2 of the lower base frame 24 form a concave shape opening upward.

The base 22 includes a protruding portion 23*a* protruding obliquely forward and upward from the seat front end portion 9*a*. The protruding portion 23*a* is a portion positioned near the center of the upper base frame 23 in the left-right direction and behind the upper opening P1. The protruding portion 23*a* has a shape in which a central portion thereof in the vehicle width direction bulges rearward. The protruding portion 23*a* functions as a restriction portion that restricts a front end position of a seating range of the rider. The protruding portion 23*a* plays a role of supporting the rider so that the rider does not deviate from the seating range of the seat 9 when the rider receives an inertial force forward while the motorcycle 1 is decelerating.

Opening and Closing Mechanism

Figure 5:
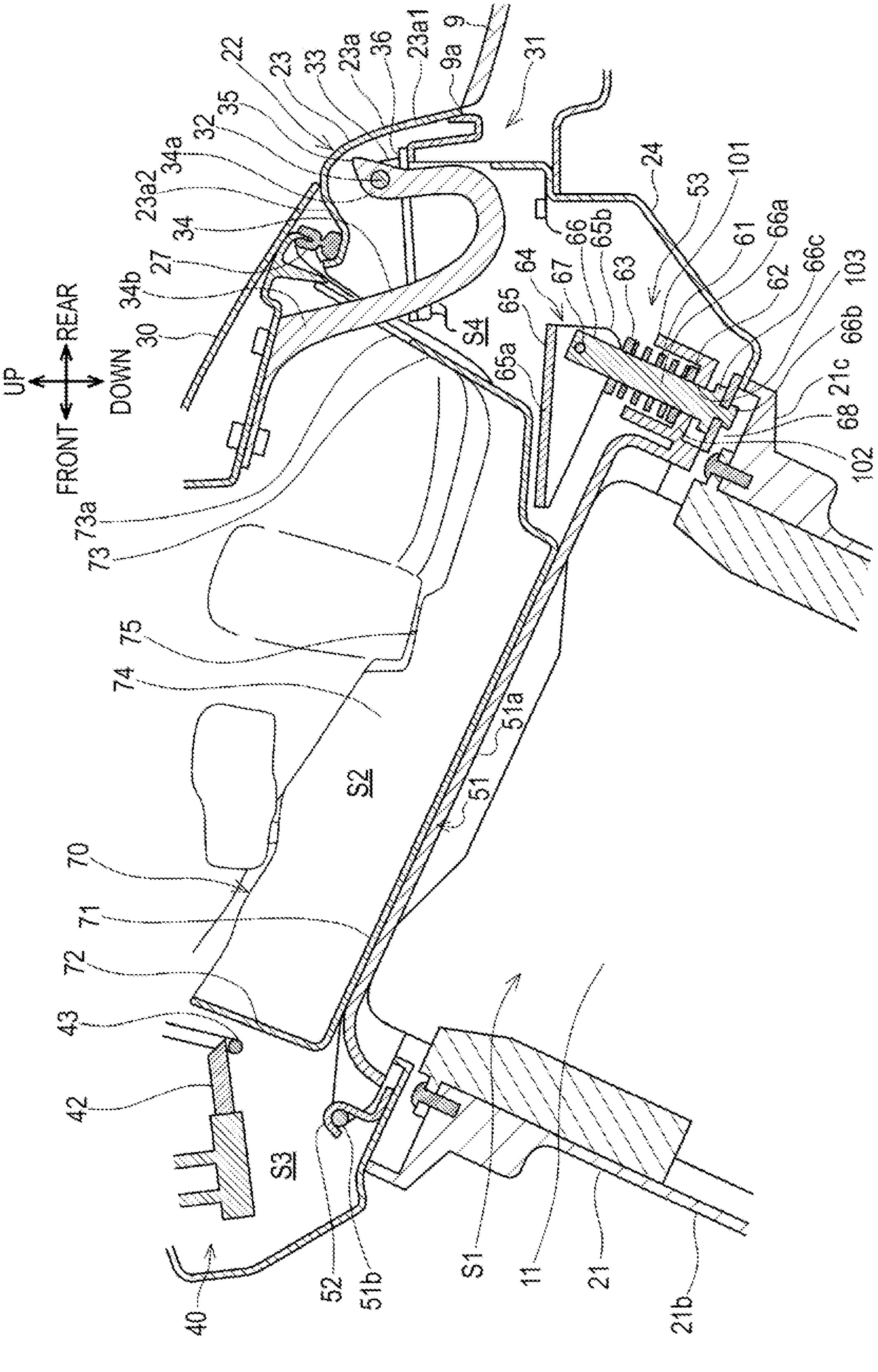
FIG. 5 is an enlarged side cross-sectional view of the vicinity of an upper portion of the battery case shown in FIG. 1.

FIG. 5 is an enlarged side cross-sectional view of the vicinity of an upper portion of the battery case 20. The motorcycle 1 includes an opening and closing mechanism 31 that opens and closes the outer cover 30. The opening and closing mechanism 31 pivots the outer cover 30 about the hinge shaft 32 between an open position where the accommodation space S is opened upward and a closed position where the accommodation space S is covered from above. As shown in FIG. 5, the opening and closing mechanism 31 includes the hinge shaft 32, a hinge support 33, and an arm 34.

The hinge shaft 32 is a shaft serving as a pivot center of the outer cover 30. The hinge shaft 32 extends in the left-right direction. The hinge shaft 32 is disposed above and in front of the seat front end portion 9*a*. The hinge shaft 32 is positioned at the center in the left-right direction of a center plane of the motorcycle 1 in the left-right direction so as to pass through the center plane. The hinge shaft 32 is disposed at a position spaced apart from at least one of a lower side or a rear side from a central portion in the left-right direction of the outer cover 30 in the closed position, that is, in the closed state. In the present embodiment, as shown in FIG. 3, a rear end portion 30*a* of the central portion in the left-right direction of the outer cover 30 in the closed state is a lower end in the central portion in the left-right direction of the outer cover 30, and the hinge shaft 32 is disposed at a position spaced downward from the rear end portion 30*a*. The hinge shaft 32 is disposed at the same position as the rear end portion 30*a* in the front-rear direction.

The hinge support 33 is fixed to the base 22. The hinge support 33 connects the base 22 and the hinge shaft 32 to each other and supports the hinge shaft 32. The hinge shaft 32 and the hinge support 33 are positioned above the vehicle body frame 4 and below the central portion in the left-right direction of the outer cover 30 in the closed state. That is, the hinge shaft 32 and the hinge support 33 can be disposed closer to the vehicle body frame 4 than the outer cover 30, and hinge support rigidity can be easily enhanced.

The arm 34 connects the outer cover 30 and the hinge shaft 32, and pivots about the hinge shaft 32 together with the outer cover 30. The arm 34 is positioned on the center plane of the motorcycle 1 in the left-right direction, that is, at the center in the vehicle width direction. As described above, the protruding portion 23*a* has a shape in which the central portion thereof in the vehicle width direction bulges rearward. Therefore, when the arm 34 is positioned at the center in the vehicle width direction, the hinge shaft 32 can be disposed closer to the vehicle body frame 4, and the hinge support rigidity can be easily enhanced.

A base end portion 34*a*, which is a rear end portion of the arm 34 when the outer cover 30 is in the closed position, is connected to the hinge shaft 32, and a distal end portion 34*b*, which is a front end portion of the arm 34 when the outer cover 30 is in the closed position, is connected to the lower surface of the outer cover 30 in the closed state. The outer cover 30 bypasses the pressing mechanism 50 to be described later and is connected to the battery case 20. Since the outer cover 30 is angularly displaced with the hinge shaft 32 serving as the rear end portion of the arm 34 as the pivot center, the outer cover 30 can be disposed at a position spaced upward from the base 22 in the open state. The arm 34 has a shape that does not interfere with the base 22 when the outer cover 30 is moved between the open position and the closed position. When viewed in the left-right direction, the arm 34 has a bent shape in which the front end portion of the arm 34 is positioned in front of a front end portion of the protruding portion 23*a* of the base 22 when the outer cover 30 is in the open position (see FIG. 4).

The shape of the base 22 and the shape of the arm 34 that does not interfere with the base 22 will be described in more detail. The protruding portion 23*a* of the base 22 includes a portion (hereinafter, also referred to as an "exposed portion") 23_a_1 exposed as viewed from the rear or above when the outer cover 30 is in the closed position, and a portion (hereinafter, also referred to as a "non-exposed portion") 23_a_2 that extends forward from a front end of the exposed portion 23_a_1 and is covered by the outer cover 30 in the closed position from above. The exposed portion 23_a_1 is a portion that closes a gap between the seat front end portion 9_a_ and the rear end portion 30_a_ of the outer cover 30 in the closed position and functions as a restriction portion that restricts the front end position of the seating range of the rider. The exposed portion 23_a_1 (specifically, a surface of the exposed portion 23_a_1 facing the front) and the hinge shaft 32 face each other in the front-rear direction. That is, the exposed portion 23_a_1 overlaps the hinge shaft 32 in the front-rear direction so as to cover the entire hinge shaft 32 when viewed from the rear.

As shown in FIG. 5, a seal 27 is attached to the outer cover 30. The seal 27 has a ring shape extending along a peripheral edge portion of the outer cover 30. A rear end portion of the seal 27 is in close contact with the base 22 when the outer cover 30 is in the closed position, thereby preventing a fluid from passing between the outer cover 30 and the base 22. When the outer cover 30 is in the closed position, the seal 27 is brought into close contact with an upper surface of the non-exposed portion 23_a_2. Therefore, the non-exposed portion 23_a_2 may also be referred to as a seal support portion. A portion of the non-exposed portion 23_a_2 where the seal 27 is brought into close contact is formed in a concave shape. Specifically, the portion of the non-exposed portion 23_a_2 where the seal 27 is brought into close contact when the outer cover 30 is in the closed position protrudes downward as compared with a portion of the non-exposed portion 23_a_2 adjacent to the rear of the former portion.

In the present embodiment, when the outer cover 30 is in the closed position, the arm 34 is formed in a U shape protruding downward. Specifically, the arm 34 extends downward as it advances forward from the base end portion 34_a_ and reaches a lower end portion positioned at an intermediate position in the front-rear direction. The arm 34 extends upward as it advances further forward from the lower end portion and reaches the distal end portion 34_b_ which is a front end portion. By forming the arm 34 in a U shape in this way, it is possible to prevent interference between the protruding portion 23_a_ (more specifically, the non-exposed portion 23_a_2) and the arm 34 and to widen a pivot range of the outer cover 30.

In the closed state of the outer cover 30, the distal end portion 34_b_ (a portion connected to the outer cover 30) of the arm 34 is disposed above the base end portion 34_a_ (a portion connected to the hinge shaft 32) of the arm 34. Since the hinge shaft 32 is disposed below a lower end portion of the outer cover 30, when the outer cover 30 is fully opened, the outer cover 30 can be moved away from the upper opening P1, and when the battery pack 11 is accommodated or taken out, interference between the outer cover 30 and the battery pack 11 is less likely to occur.

A notch 73_a_ for inserting the arm 34 is formed in the second partition wall 73 of the casing 70 such that the casing 70 does not interfere with the arm 34.

The opening and closing mechanism 31 includes a stopper structure that restricts the pivot range of the outer cover 30. Specifically, the base end portion 34_a_ of the arm 34 includes a protrusion 35 protruding in a radial direction about the hinge shaft 32. The protrusion 35 abuts a stopper portion 36 fixed to the base 22 when the arm 34 pivots together with the outer cover 30 and the outer cover 30 is in the open position pivoted by a predetermined angle from the closed position. The protrusion 35 and the stopper portion (stopper) 36 constitute the stopper structure. As a result, the pivot range of the outer cover 30 is restricted. A position of the protrusion 35 is adjusted such that, when the outer cover 30 is moved to the open position, the pivot range of the outer cover 30 is restricted to a range in which the arm 34 does not come into contact with the base 22 and the rear end portion of the outer cover 30 does not come into contact with the protruding portion 23_a_. By disposing the stopper structure that restricts the pivot range of the outer cover 30 around the hinge shaft 32, the fourth space S4 which is a space covered by the protruding portion 23_a_ can be effectively utilized.

The motorcycle 1 also includes the lock mechanism 40. The lock mechanism 40 is a mechanism that holds the outer cover 30 in the closed position. The lock mechanism 40 includes an insertion port 41, a lock moving portion 42, and a lock fixing portion 43. The insertion port 41 is provided at a front-side portion of the base 22, more specifically, at a front-side portion of the upper base frame 23. The lock moving portion 42 is movable between a locked position and an unlocked position when a key of the rider is inserted into the insertion port 41 and operated. The lock fixing portion 43 is locked to the lock moving portion 42 in the locked position such that the outer cover 30 does not move from the closed position to the open position. The lock moving portion 42 is attached to the upper base frame 23, and the lock fixing portion 43 is fixed to the outer cover 30. As a result, the lock mechanism 40 can switch between a locked state in which the outer cover 30 is held in the closed position and an unlocked state in which the outer cover 30 is released from being held in the closed position.

In the present embodiment, the base 22, the outer cover 30, the opening and closing mechanism 31, and the lock mechanism 40 are unitized as a cover unit. By fixing the cover unit to the case main body 21, that is, by fastening the base 22 to the flanges 21_c_ of the case main body 21, a battery accommodation unit is unitized. Since the elements related to the attachment and detachment of the battery pack 11 are unitized in this way, it is easy to design and assemble the motorcycle 1 so as to facilitate the attachment and detachment of the battery pack 11. For example, a design in which the upper opening P1 is positioned in a direction in which the battery pack 11 is pulled out from the case main body 21 such as a design that does not require changing the direction in which the battery pack 11 is pulled out halfway to avoid the elements of the cover unit such as the arm 34 is facilitated (see a two-dot chain line in FIG. 4). For example, it is easy to adjust positions of the lower opening P2 and the upper opening P1 of the base 22 with respect to the opening edge of the case main body 21.

Pressing Mechanism

The motorcycle 1 includes the pressing mechanism 50. The pressing mechanism 50 is disposed in the accommodation space S. The pressing mechanism 50 includes the inner cover 51, the engaging member 52, and the retainer 53.

The inner cover 51 is an abutting member that can abut the battery pack 11 accommodated in the accommodation space S of the battery case 20. In the present embodiment, when the battery pack 11 is accommodated in the battery case 20, an upper portion of the battery pack 11 protrudes slightly upward from the opening of the case main body 21. Therefore, the inner cover 51 has a concave shape that opens downward so as to cover the portion of the battery pack 11 protruding from the case main body 21 and close the battery space S1. The concave surface of the inner cover 51 facing downward abuts an upper surface of the accommodated battery pack 11. Hereinafter, a position of the inner cover 51 when the inner cover 51 abuts the battery pack 11 is referred to as an abutment position or the closed position.

In the present embodiment, the battery case 20 supports the two battery packs 11 aligned in the left-right direction from below such that heights of upper surfaces of the battery packs 11 coincide with each other, and the upper surfaces of the two battery packs 11 abut the one inner cover 51.

Figure 6:
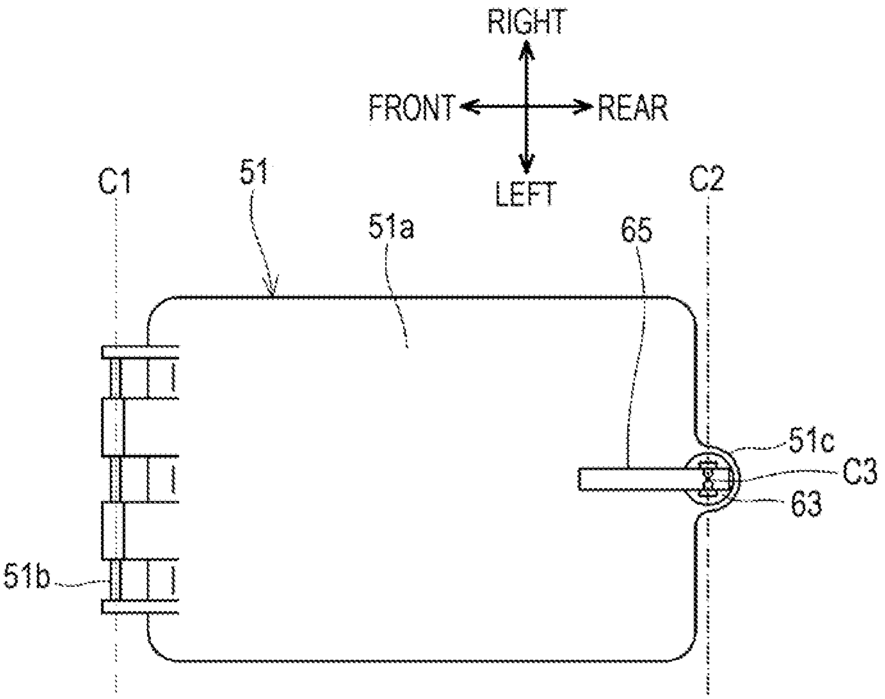
FIG. 6 is a top view of an inner cover shown in FIG. 1.

The inner cover 51 is detachable from the battery case 20. FIG. 6 is a top view of the inner cover 51. The inner cover 51 includes a cover main body 51*a*, an engaged portion 51*b*, and a support portion 51*c*. When the inner cover 151 is in the abutment position, the cover main body 151*a* closes the lower opening P2. The engaged portion 51*b* is fixed to a front end portion of the cover main body 51*a*. The engaged portion 51*b* can be engaged with the engaging member 52 fixed to the battery case 20. The engaged portion 51*b* has a rod shape extending in the left-right direction. Hereinafter, the engaged portion 51*b* may also be referred to as an engaged shaft 51*b*.

The engaging member 52 has an engaging structure that is detachable from the inner cover 51. The inner cover 51 can pivot about an axis C1 of the engaged shaft 51*b* in a state in which the engaged shaft 51*b* is engaged with the engaging member 52. Specifically, the engaging member 52 is disposed in front of the lower opening P2 of the base 22 (more specifically, the lower base frame 24). The engaging member 52 is disposed in the third space S3. The engaging member 52 is fixed to the base 22 and has a hook shape. Hereinafter, the engaging member 52 may also be referred to as an engaging hook 52. When the engaged shaft 51*b* of the inner cover 51 is hooked to the engaging hook 52, the inner cover 51 can pivot about the axis C1 of the engaged shaft 51*b*. When the inner cover 51 pivots, the inner cover 51 abuts the battery pack 11 and closes the battery space S1, or moves away from the battery pack 11 to open the battery space S1.

The support portion 51*c* is fixed to a rear end portion of the cover main body 51*a*. The support portion 51*c* supports a later-described compression spring 61 and the like, which are components of the retainer 53.

As shown in FIG. 5, when the inner cover 51 is in the abutment position, the retainer 53 is disposed behind the lower opening P2 of the base 22 (more specifically, the lower base frame 24). In other words, the retainer 53 is disposed on a side where the upper surface of the battery pack 11 is inclined downward. The retainer 53 is disposed on the same side as the hinge shaft 32 with respect to the battery pack 11. That is, in a state in which the casing 70 is disposed in the accommodation space S, the retainer 53 is accommodated in the fourth space S4 similar to the hinge shaft 32 of the opening and closing mechanism 31. Therefore, the hinge shaft 32 and the retainer 53 of the pressing mechanism 50 are positioned at positions hidden by the second partition wall 73, that is, at positions that are difficult to be visually recognized by a user only by opening the outer cover 30.

The retainer 53 holds the inner cover 51 abutting the battery pack 11 while pressing the inner cover 51 toward the battery pack 11. That is, the retainer 53 has a pressing function of pressing the inner cover 51 downward when the inner cover 51 is in the abutment position. The retainer 53 also has a locking function of locking the inner cover 51 to the battery case 20 when the inner cover 51 is in the abutment position.

The retainer 53 includes the compression spring 61, a first spring seat 62, a second spring seat 63, an operating member 64, and a locked portion 68. Of the components of the retainer 53, the compression spring 61, the first spring seat 62, the second spring seat 63, and the operating member 64 are supported by the support portion 51*c* of the inner cover 51 and can move integrally with the inner cover 51. The compression spring 61 is a coil spring. The first spring seat 62 and the second spring seat 63 are annular. The operating member 64 is a member operated by a user.

Of the components of the retainer, the locked portion 68 of the retainer 53 is provided in the battery case 20. Specifically, the locked portion 68 is disposed on the lower base frame 24 on a rear side of the lower opening P2 of the lower base frame 24. The locked portion 68 is positioned at a position overlapping the upper opening P1 in a top view of the motorcycle 1 (see FIG. 2). That is, the retainer 53 including the locked portion 68 is positioned at a position overlapping the upper opening P1 in a top view of the motorcycle 1. Therefore, the retainer 53 is positioned at a position where the user can easily access.

The locked portion 68 is locked by a later-described locking portion 66*b* of the operating member 64. In the present embodiment, the locked portion 68 is a hole extending in a predetermined direction. For example, the locked portion 68 has an elongated hole shape or a keyhole shape. Hereinafter, the locked portion 68 may also be referred to as a locked hole 68. In the present embodiment, the locked hole 68 extends in the left-right direction, but may extend in the front-rear direction, for example.

As shown in FIG. 5, the first spring seat 62 supports a first end portion 61*a* of the compression spring 61, and the second spring seat 63 supports a second end portion 61*b* of the compression spring 61. As shown in FIG. 5, when the inner cover 51 is in the abutment position, the first end portion 61*a* is a lower end portion of the compression spring 61, and the second end portion 61*b* is an upper end portion of the compression spring 61. That is, when the inner cover 51 is in the abutment position, the first spring seat 62 is positioned on a lower side of the compression spring 61, and the second spring seat 63 is positioned on an upper side of the compression spring 61.

The first spring seat 62 is fixed to the inner cover 51. Specifically, the support portion 51*c* of the inner cover 51 includes a bottomed cylindrical portion 101 opened upward, and the first spring seat 62 is disposed on a bottom 102 of the cylindrical portion 101. The compression spring 61 is accommodated in the cylindrical portion 101 of the support portion 51*c* such that the first spring seat 62 supports the first end portion 61*a* of the compression spring 61. That is, the inner cover 51 includes an accommodating portion (in the present embodiment, the cylindrical portion 101) accommodating the compression spring 61. The first spring seat 62 may be configured by a part of the inner cover 51. The bottom 102 of the cylindrical portion 101 of the support portion 51*c* in which the first spring seat 62 is disposed is formed with a through hole 103 through which a cam support 66, which will be described later, is inserted.

The second spring seat 63 is connected to the inner cover 51 so as to be movable relative to the inner cover 51. In the present embodiment, the second spring seat 63 is connected to the inner cover 51 via the operating member 64.

The operating member 64 includes a cam lever 65 and the cam support 66. The cam lever 65 is disposed on a side opposite to the compression spring 61 with respect to the second spring seat 63. The second spring seat 63 is sandwiched between the cam lever 65 and the compression spring 61. The cam lever 65 is supported by the cam support

66 via a support shaft 67 extending in the left-right direction so as to be pivotable about an axis C2 of the support shaft 67.

The cam lever 65 includes a lever portion 65*a* which is a portion a user touches with hands, and a pressing portion 65*b* which is displaced when the lever portion 65*a* is operated. The cam lever 65 has a shape extending in a radial direction from the support shaft 67 so as to be easily operated by the user, and the extending portion is the lever portion 65*a*. The lever portion 65*a* corresponds to an operator. The pressing portion 65*b* is a curved surface portion whose distance from the support shaft 67 changes corresponding to a pivot angle of the cam lever 65 when viewed in a direction of the axis C2 of the support shaft 67.

The pressing portion 65*b* presses the second spring seat 63 toward the compression spring 61. By pivoting the cam lever 65 about the axis C2, the pressing portion 65*b* can be displaced between a pressing position where the pressing portion 65*b* presses the inner cover 51 against the battery pack 11 and a pressing-released position where a pressing force when the inner cover 51 is in the pressing position is released. A state of the retainer 53 in which the pressing portion 65*b* is in the pressing position is referred to as a pressing state, and a state of the retainer 53 in which the pressing portion 65*b* is in the pressing-released position is referred to as a pressing-released state. In the present embodiment, the pressing portion 65*b* in the pressing-released position does not generate a pressing force for pressing the inner cover 51 against the battery pack 11. However, the pressing portion 65*b* in the pressing-released position may generate a pressing force smaller than the pressing force generated when the pressing portion 65*b* is in the pressing position.

The cam support 66 is connected to the inner cover 51 and supports the cam lever 65 via the support shaft 67. The cam support 66 includes a rod-shaped portion 66*a* extending along an axis C3 of the cylindrical portion 101. The support shaft 67 is supported at one end portion of the rod-shaped portion 66*a*. The rod-shaped portion 66*a* is inserted radially inwardly of the second spring seat 63, the compression spring 61, and the first spring seat 62. The rod-shaped portion 66*a* is also inserted into the through hole 103 of the bottom 102 of the cylindrical portion 101 of the support portion 51*c*.

The cam support 66 includes the locking portion 66*b* which is a protrusion protruding from the other end portion of the rod-shaped portion 66*a* in a direction perpendicular to the axis C3. The locking portion 66*b* is positioned at a position protruding from the through hole 103 of the rod-shaped portion 66*a* to a side opposite to the compression spring 61. That is, the locking portion 66*b* is positioned below the bottom 102 of the cylindrical portion 101.

When the locking portion 66*b* rotates about the axis C3 and is in a predetermined unlocking position, the locking portion 66*b* can be inserted into the locked hole 68. In the present embodiment, the unlocking position is a position where an extending direction of the locked hole 68 coincides with a protruding direction of the locking portion 66*b*. In the present embodiment, since the locked hole 68 extends in the left-right direction, when the protruding direction of the locking portion 66*b* coincides with the left-right direction, the locking portion 66*b* can be inserted into the locked hole 68. When the locking portion 66*b* rotates about the axis C3 and is in a locking position other than the unlocking position, the locking portion 66*b* cannot be inserted into the locked hole 68. That is, after the locking portion 66*b* is inserted into the locked hole 68 by operating the operating member 64, the locking portion 66*b* is rotated about the axis C3 such that the locking portion 66*b* cannot be inserted into the locked hole 68, whereby the inner cover 51 is locked so as not to be separated from the locked hole 68.

A guide portion 66*c* is provided in a portion of the rod-shaped portion 66*a* protruding downward from the through hole 103. The guide portion 66*c* has a flange shape, and when locking or unlocking is performed by the locking portion 66*b*, the guide portion 66*c* abuts the periphery of the locked hole 68 to guide the rotation of the operating member 64 about the axis C3. For example, a dimension between the guide portion 66*c* and the locking portion 66*b* substantially matches a dimension of the locked hole 68 in a penetrating direction.

The guide portion 66*c* has a size or a shape that cannot be inserted into the through hole 103 or the locked hole 68. Therefore, when an operation of lifting the operating member 64 upward is performed, the inner cover 51 is also lifted while being supported by the guide portion 66*c*. The operating member 64 is connected to the inner cover 51 so as to be displaceable. For example, the operating member 64 is connected to the support portion 51*c* of the inner cover 51 so as to be rotatable about the axis C3 of the cam support 66. The operating member 64 is connected to the support portion 51*c* of the inner cover 51 so as to be displaceable with respect to the inner cover 51 in the direction of the axis C3 of the cam support 66.

In the pressing mechanism 50, by operating the cam lever 65, both locking the inner cover 51 to the battery case 20 and pressing the inner cover 51 downward can be performed. In a state in which the inner cover 51 is in the abutment position, more specifically, in a state in which the locking portion 66*b* is inserted into the locked hole 68, the cam lever 65 is operated to rotate the locking portion 66*b* about the axis C3. When the locking portion 66*b* is displaced from the unlocking position to the locking position, the locking portion 66*b* cannot be inserted into the locked hole 68, and the locked hole 68 is locked by the locking portion 66*b*. As a result, the position of the support shaft 67 is fixed.

Thereafter, by pivoting the cam lever 65 about the axis C2 of the support shaft 67, the pressing portion 65*b* is displaced from the pressing-released position to the pressing position with respect to the axis C2. As a result, the second spring seat 63 approaches the first spring seat 62. As a result, the compression spring 61 is compressed, and a biasing force of the compression spring 61 is generated or increased in the inner cover 51 in a direction away from the support shaft 67 of the cam support 66, that is, downward. As described above, the retainer 53 is configured to hold the second spring seat 63 in a state in which the second spring seat 63 is displaced with respect to the first spring seat 62 such that the inner cover 51 is biased toward the battery pack 11 by the compression spring 61.

In the present embodiment, the inner cover 51 or the battery pack 11 does not completely close the lower opening P2 when not pressed by the pressing mechanism 50. That is, when the inner cover 51 is not pressed by the pressing mechanism 50, a slight gap is formed between the base 22 and a part of a peripheral edge of the cover main body 51*a*. This gap disappears when the inner cover 51 is pressed by the pressing mechanism 50. The inner cover 51 may not abut the battery pack 11 when not pressed by the pressing mechanism 50, and may abut the battery pack 11 when pressed by the pressing mechanism 50.

Procedure for Taking Out Battery Pack

A procedure for taking out the battery pack 11 from the motorcycle 1 (more specifically, the battery case 20) will be described. First, the lock of the outer cover 30 by the lock mechanism 40 is released by a key operation, and then, as shown in FIG. 4, the outer cover 30 is pivoted from the closed position to the open position.

Next, the casing 70 is taken out to the outside from the accommodation space S through the upper opening P1.

Figure 7:
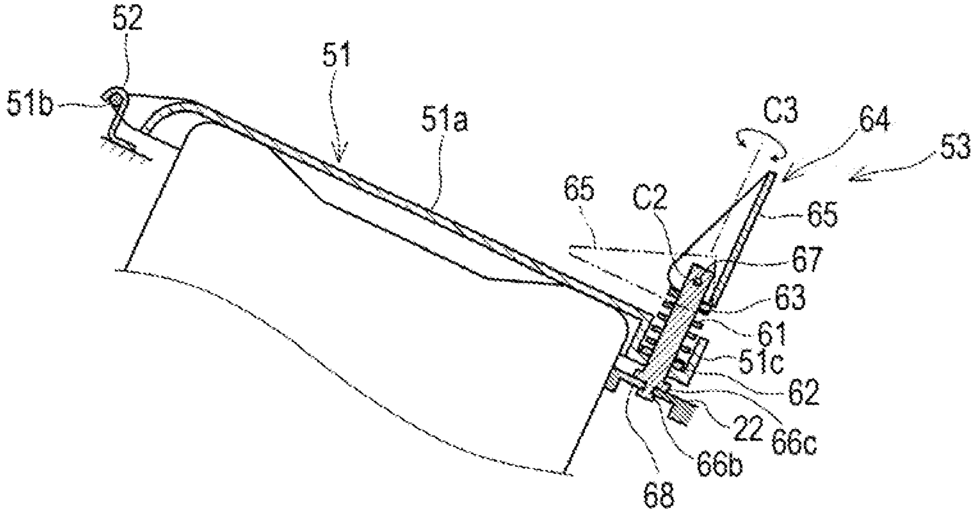
FIG. 7 is a side cross-sectional view of the vicinity of the inner cover for illustrating a pressing release operation of the inner cover shown in FIG. 1.
Figure 8:
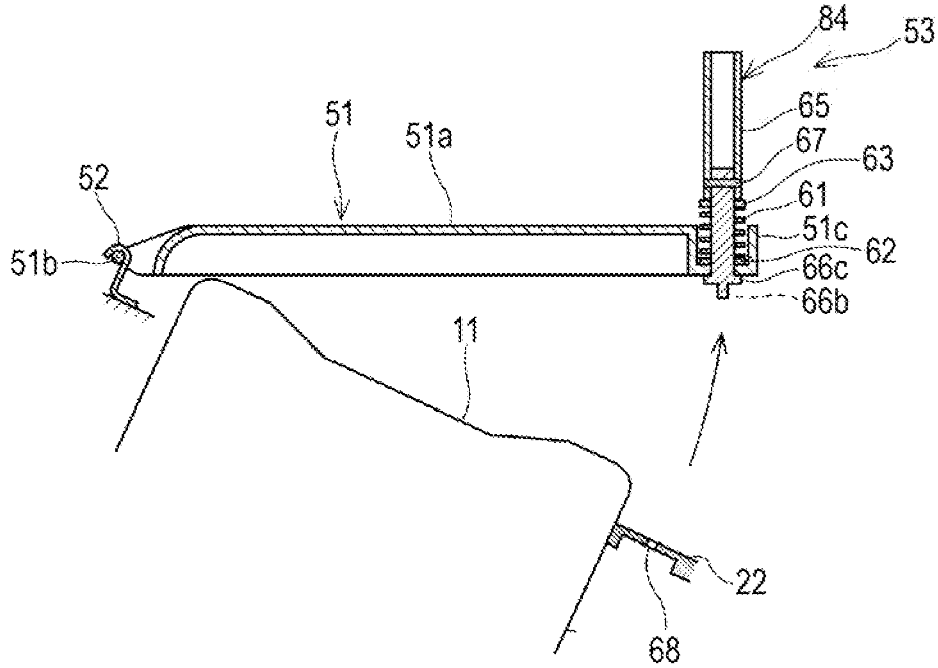
FIG. 8 is a side cross-sectional view of the vicinity of the inner cover for illustrating an opening operation of the inner cover shown in FIG. 1.

Next, as shown in FIG. 7, the cam lever 65 is pivoted about the axis C2 to reduce a pressing force of the compression spring 61. Then, the cam lever 65 is pivoted about the axis C3, and the locking portion 66*b* is aligned with a direction in which the locking portion 66*b* can be inserted into the locked hole 68. After that, as shown in FIG. 8, by lifting the cam lever 65 upward, the inner cover 51 is pivoted about the axis C1 of the engaged shaft 51*b*. Next, after the inner cover 51 is moved such that a state in which the engaged shaft 51*b* is hooked to the engaging hook 52 is released, the inner cover 51 is taken out to the outside from the accommodation space S through the upper opening P1. Then, the battery pack 11 in the case main body 21 is pulled out upward and taken out to the outside from the accommodation space S through the upper opening P1.

In this way, taking out the battery pack 11 from the motorcycle 1 is completed. The accommodation of the battery pack 11 in the motorcycle 1 can be performed by a procedure reverse to taking out the battery pack 11.

Operation and Effect

As described above, according to the motorcycle 1 of the present embodiment, the hinge shaft 32 is disposed above and in front of the seat front end portion 9*a*. Therefore, when moving the outer cover 30 from the closed position to the open position, it is possible to prevent the pivot range of the outer cover 30 from being restricted by the seat 9. Accordingly, it is possible to provide the motorcycle 1 having a cover opening and closing structure that makes it easy to accommodate the battery pack 11 in the accommodation space S or take out the battery pack 11 from the accommodation space S. Since the seat 9 is disposed behind the battery space 51 in the front-rear direction, it is not necessary to remove the seat 9 from the vehicle body of the motorcycle 1 when attaching and detaching the battery pack 11.

In the present embodiment, since the hinge shaft 32 serving as a pivot center of the outer cover 30 is disposed in a space covered by the protruding portion 23*a*, the space covered by the protruding portion 23*a* can be effectively utilized.

In the present embodiment, when viewed in the left-right direction, the arm 34 has a bent shape in which the front end portion of the arm 34 is positioned in front of the front end portion of the protruding portion 23*a* of the base 22 when the outer cover 30 is in the open position. Therefore, it is possible to prevent the protruding portion 23*a* which is visible to a user from interfering with the arm 34.

In the present embodiment, since the hinge shaft 32 is positioned on the center plane of the motorcycle 1 in the left-right direction, it is possible to design the protruding portion 23*a* of the base 22 and the outer cover 30 such that a dimension in the left-right direction is reduced.

In the present embodiment, since the arm 34 is positioned on the center plane of the motorcycle 1 in the left-right direction, it is possible to design the protruding portion 23*a* of the base 22 and the outer cover 30 such that the dimension in the left-right direction is reduced.

In the present embodiment, by forming the base 22 in a frame shape, it is possible to form a passage through which the battery pack 11 passes when the battery pack 11 is accommodated in the battery space S1 or taken out from the battery space S1.

In the present embodiment, the second partition wall 73 can prevent luggage from hitting the hinge shaft 32 and a member supporting the hinge shaft 32. For example, even if the vehicle body is inclined obliquely forward, the second partition wall 73 can prevent luggage from moving into the shaft accommodation space S4.

Second Embodiment

Figure 9:
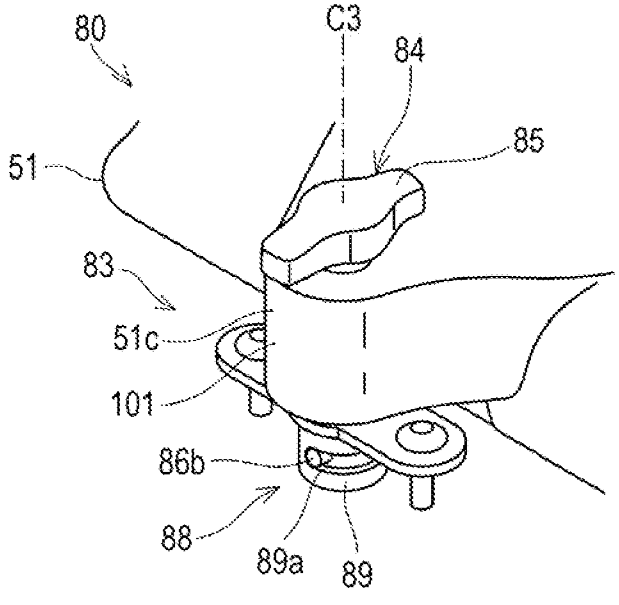
FIG. 9 is an enlarged perspective view of the vicinity of a retainer in a pressing state of a motorcycle according to a second preferred embodiment.
Figure 10:
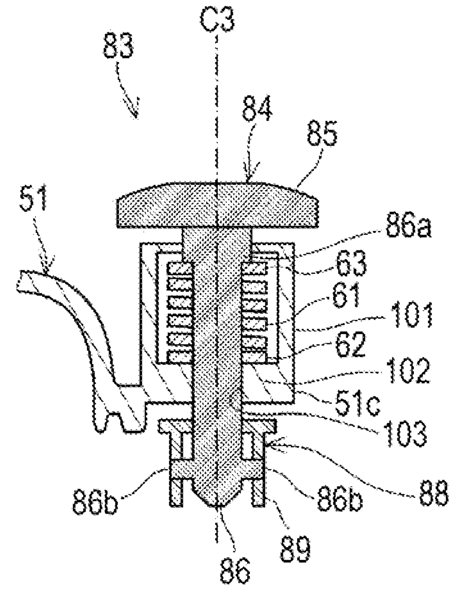
FIG. 10 is a side cross-sectional view of the retainer according to the second embodiment.
Figure 11:
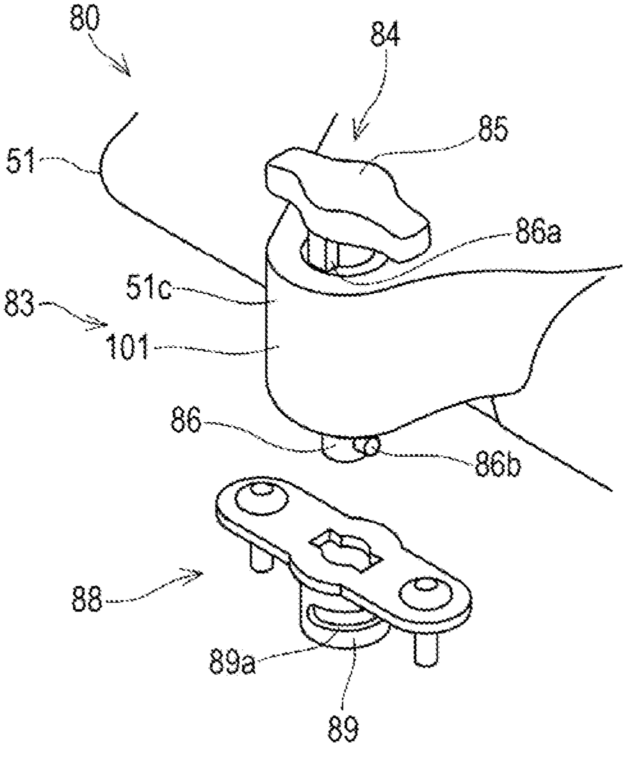
FIG. 11 is a diagram illustrating a state in which an inner cover is slightly opened in the second embodiment.

Next, a motorcycle according to a second embodiment will be described with reference to FIGS. 9 to 11. In the second embodiment, the same components as those of the first embodiment are denoted by the same reference numerals, and the description thereof is omitted. FIG. 9 is an enlarged perspective view of the vicinity of a retainer 83 in a pressing state of a pressing mechanism 80 in the second embodiment. FIG. 10 is a side cross-sectional view of the retainer 83. FIG. 11 is a diagram illustrating a state in which the inner cover 51 of the pressing mechanism 80 is slightly opened.

The present embodiment differs from the first embodiment in the structure of the retainer of the pressing mechanism. More specifically, in the pressing mechanism 50 of the first embodiment, the retainer 53 is of a cam lever type, whereas in the pressing mechanism 80 of the present embodiment, the retainer 83 is of a cylindrical cam type. Similarly to the retainer 53 of the first embodiment, when the inner cover 51 is in a closed position, the retainer 83 is disposed behind the lower opening P2 of the base 22 (more specifically, the lower base frame 24). Similarly to the retainer 53, the retainer 83 has both functions of a pressing function of pressing the inner cover 51 and a locking function of locking the inner cover 51 to the battery case 20.

The retainer 83 includes the compression spring 61, the first spring seat 62, the second spring seat 63, an operating member 84, and a locked portion 88. Configurations of the compression spring 61, the first spring seat 62, the second spring seat 63, and the support portion 51*c* of the inner cover 51 that supports the compression spring 61, the first spring seat 62, and the second spring seat 63 are the same as those of the above embodiment, and thus the description thereof will be omitted.

The operating member 84 is connected to the inner cover 51 so as to be displaceable. For example, the operating member 84 is connected to the support portion 51*c* of the inner cover 51 so as to be rotatable about the axis C3. The operating member 84 is connected to the support portion 51*c* of the inner cover 51 so as to be displaceable with respect to the inner cover 51 in the direction of the axis C3.

The operating member 84 includes a rotating handle 85 that a user operates with hands, and a rotating shaft 86. The rotating handle 85 corresponds to an operator. The rotating handle 85 is disposed on a side opposite to the compression spring 61 with respect to the second spring seat 63. The rotating handle 85 is a handle for rotating about the axis C3 of the cylindrical portion 101. In the present embodiment, the rotating handle 85 has a point-symmetrical shape about the axis C3.

The rotating handle 85 is fixed to one end portion of the rotating shaft 86. The rotating shaft 86 is inserted radially inwardly of the second spring seat 63, the compression spring 61, and the first spring seat 62. The rotating shaft 86 is also inserted into the through hole 103 of the bottom 102 of the cylindrical portion 101 of the support portion 51*c*.

The rotating shaft 86 includes a pressing portion 86*a* and a locking portion 86*b*. The pressing portion 86*a* is positioned on a side opposite to the compression spring 61 with respect to the second spring seat 63. The pressing portion 86*a* presses the second spring seat 63 toward the compression spring 61. The second spring seat 63 is sandwiched between the pressing portion 86*a* and the compression spring 61.

The locking portion 86*b* is a pin-shaped protrusion protruding in a direction perpendicular to the axis C3. Hereinafter, the locking portion 86*b* may be referred to as a locking pin 86*b*. The locking pin 86*b* is positioned on a side opposite to the compression spring 61 from the through hole 103.

The locking pin 86*b* has a size or a shape that cannot be inserted into the through hole 103. Therefore, when an operation of lifting the operating member 84 upward is performed, the inner cover 51 is also lifted while being supported by the locking pin 86*b*.

The locked portion 88 includes a hollow cylindrical cam 89 fixed to the battery case 20. The cylindrical cam 89 has a size that can be engaged with the locking pin 86*b*. That is, an inner diameter of the cylindrical cam 89 is shorter than a length from the axis C3 to an end portion on a radially outer side of the locking pin 86*b*.

The cylindrical cam 89 has an engaging hole 89*a* that can be engaged with the locking pin 86*b*. An upper end of the engaging hole 89*a* is at an upper end edge of the cylindrical cam 89, and the locking pin 86*b* can move in and out of the engaging hole 89*a* in an up-down direction from the upper end of the engaging hole 89*a*. The engaging hole 89*a* has a spiral shape that guides the locking pin 86*b* downward when the operating member 84 rotates about the axis C3 extending in a biasing direction of the compression spring 61. A lower end portion of the engaging hole 89*a* has a shape that holds the locking pin 86*b*. For example, the lower end portion of the engaging hole 89*a* may have a shape extending along a surface perpendicular to a central axis of the cylindrical cam 89.

In the pressing mechanism 80, by rotating the rotating handle 85 about the axis C3 when the inner cover 51 is in an abutment position, both locking of the inner cover 51 to the battery case 20 and holding of the inner cover 51 in a state of being pressed downward can be performed at once. When the inner cover 51 is in the abutment position, more specifically, when the rotating handle 85 is rotated while being pressed downward, the locking pin 86*b* is inserted into the engaging hole 89*a* and guided downward spirally to reach the lower end portion of the engaging hole 89*a*. In this way, a biasing force of the compression spring 61 is generated or increased in a direction in which the inner cover 51 is pressed downward. Since the locking pin 86*b* is held at the lower end portion of the engaging hole 89*a*, the inner cover 51 can be locked to the battery case 20 in a state of being pressed downward.

A procedure for taking out the battery pack 11 from the motorcycle 1 (more specifically, the battery case 20) including the pressing mechanism 80 will be described. Pivoting the outer cover 30 from a closed position to an open position and taking out the casing 70 to the outside from the accommodation space S through the upper opening P1 are the same as the procedure for taking out the battery pack 11 described in the above embodiment.

After the outer cover 30 is moved to the open position and the casing 70 is taken out, the rotating handle 85 of the retainer 83 in the pressing state shown in FIG. 9 is rotated about the axis C3, whereby the locking pin 86*b* is spirally moved upward from the lower end portion (that is, a locking position) of the engaging hole 89*a*. Since the pressing portion 86*a* also gradually rises together with the locking pin 86*b*, the biasing force of the compression spring 61 is gradually reduced. After the rotating handle 85 is rotated to a rotation position (that is, an unlocking position) where the locking pin 86*b* can be pulled out of the engaging hole 89*a*, the rotating handle 85 is lifted upward. As a result, as shown in FIG. 11, the locking pin 86*b* moves out of the engaging hole 89*a* from an upper end of the cylindrical cam 89, and the inner cover 51 pivots about the axis C1 of the engaged shaft 51*b*. Since the subsequent procedure is the same as the procedure described in the first embodiment, the description thereof will be omitted.

Third Embodiment

Figure 12:
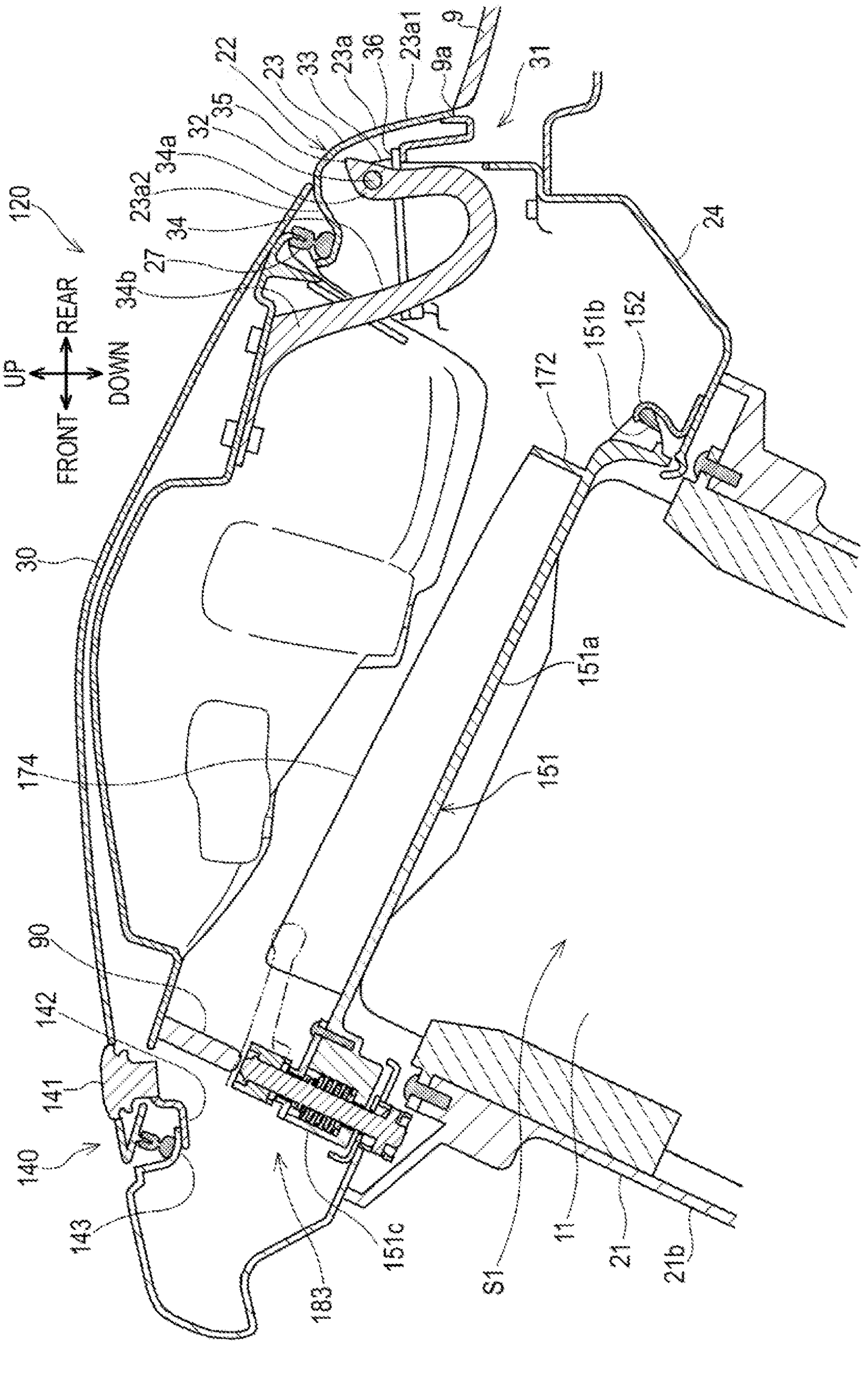
FIG. 12 is an enlarged side cross-sectional view of the vicinity of an upper portion of a battery case of a motorcycle according to a third embodiment.

Next, a motorcycle according to a third embodiment will be described with reference to FIGS. 12 to 15. In the third embodiment, the same components as those of the first and second embodiments are denoted by the same reference numerals, and the description thereof is omitted. FIG. 12 is an enlarged side cross-sectional view of the vicinity of an upper portion of a battery case 120 of the motorcycle according to the third embodiment.

A pressing mechanism 150 in the present embodiment includes an inner cover 151, an engaging member 152, and a retainer 183. Basically, roles of the inner cover 151, the engaging member 152, and the retainer 183 of the pressing mechanism 150 are the same as those of the inner cover 51, the engaging member 52, and the retainers 53 and 83 of the pressing mechanisms 50 and 80 of the first and second embodiments, respectively. However, positions and structures of the inner cover 151, the engaging member 152, and the retainer 183 of the pressing mechanism 150 are slightly different from those of the inner cover 51, the engaging member 52, and the retainers 53 and 83 of the pressing mechanisms 50 and 80 of the first and second embodiments, respectively.

For example, in the pressing mechanism 150 according to the present embodiment, the positions of the engaging member 152 and the retainer 183 are opposite to the positions of the engaging member 52 and the retainers 53 and 83 of the pressing mechanisms 50 and 80 of the first and second embodiments. As shown in FIG. 12, the engaging member 152 is disposed behind the lower opening P2 of the base 22 (more specifically, the lower base frame 24). When the inner cover 151 is in an abutment position, the retainer 183 is disposed in front of the lower opening P2 of the base 22 (more specifically, the lower base frame 24).

Figure 13:
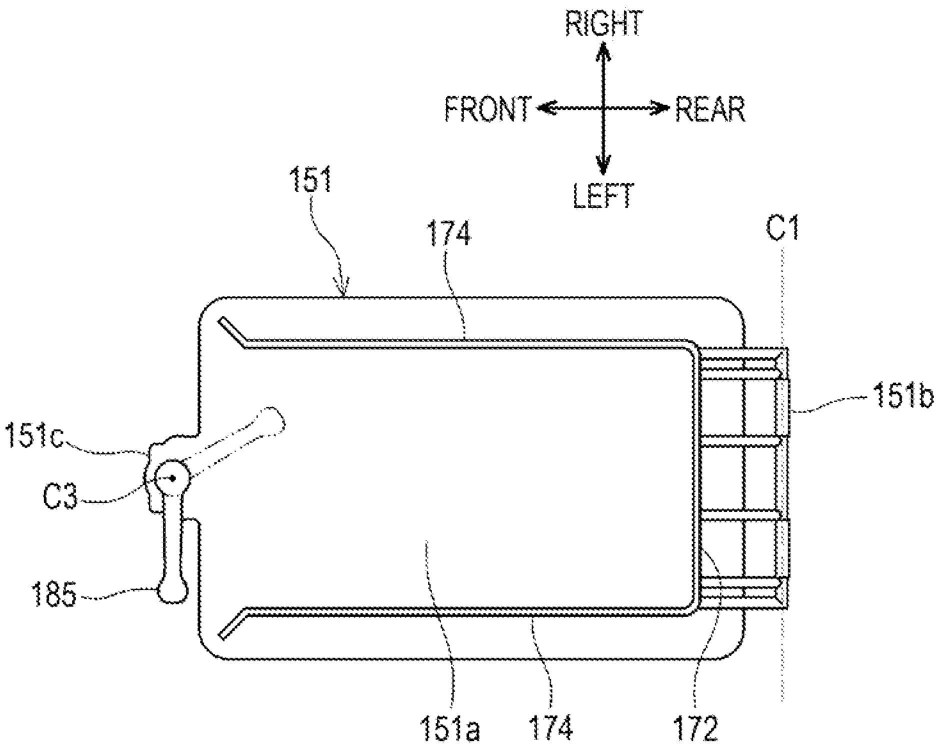
FIG. 13 is a top view of an inner cover according to the third embodiment.
Figure 14:
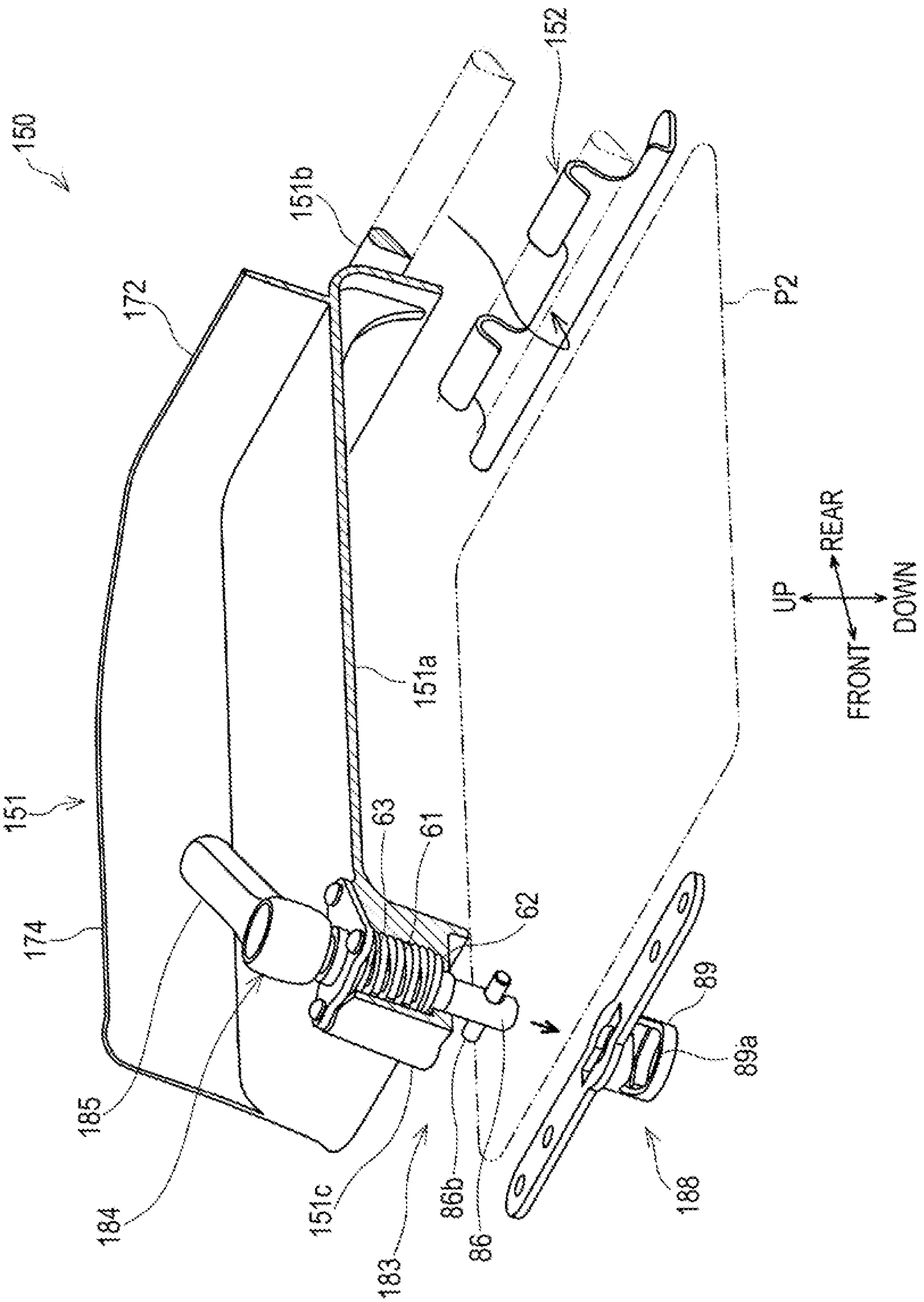
FIG. 14 is a perspective view illustrating a configuration of a pressing mechanism according to the third embodiment.

FIG. 13 is a top view of the inner cover 151 in the third embodiment. FIG. 14 is a perspective view illustrating a configuration of the pressing mechanism 150 in the third embodiment. In FIG. 14, the left part of the inner cover 151 is omitted so that the structure of the retainer 183 is easy to see.

In the present embodiment as well, the inner cover 151 is detachable from the battery case 120. As shown in FIG. 13, the inner cover 151 includes a cover main body 151*a*, an engaged portion 151*b*, and a support portion 151*c*. The cover main body 151*a* closes the lower opening P2 when the inner cover 151 is in an abutment position where the inner cover 151 abuts the battery pack 11.

In the present embodiment, a partition wall 172 and a pair of side walls 174 are provided on an upper surface of the cover main body 151*a*. The partition wall 172 rises upward from the vicinity of an end edge portion on a rear side of the cover main body 151*a*. The pair of side walls 174 extend forward from both ends of the partition wall 172 in a left-right direction. A space sandwiched between the pair of side walls 174 in the left-right direction functions as a luggage accommodation space for accommodating luggage as an accommodation object. The partition wall 172 prevents an accommodation object placed on the upper surface of the cover main body 151*a* from moving to the rear of the cover main body 151*a*, that is, a space in which the engaging member 152 is disposed (see FIG. 12). As described above, in the present embodiment, since the inner cover 151 itself functions as a casing on which the accommodation object is placed, it is not necessary to separately mount the casing 70 on the inner cover 151 as in the first and second embodiments.

The engaged portion 151*b* is fixed to a rear end portion of the cover main body 151*a*. The engaged portion 51*b* can be engaged with the engaging member 152 fixed to the battery case 20. The engaged portion 151*b* has a rod shape extending in the left-right direction. Hereinafter, the engaged portion 151*b* may also be referred to as an engaged shaft 151*b*.

As shown in FIG. 14, the engaging member 152 has an engaging structure that is detachable from the inner cover 151. The inner cover 151 is pivotable about the axis C1 of the engaged shaft 151*b* in a state in which the engaged shaft 151*b* is engaged with the engaging member 152. The engaging member 152 has a hook shape similar to the engaging member 52. The hook shape of the engaging member 152 is a hook shape that is open to the lower opening P2, but may be a hook shape that is open to a side opposite to the side where the lower opening P2 is positioned.

As shown in FIG. 14, the support portion 151*c* is fixed to a side opposite to the engaged portion 151*b* of the cover main body 151*a*, that is, to a front end portion of the cover main body 151*a*. The support portion 151*c* supports the later-described compression spring 61 and the like, which are components of the retainer 183. When the inner cover 151 is in the abutment position, the retainer 183 is disposed in front of the lower opening P2 of the base 22 (more specifically, the lower base frame 24).

The retainer 183 holds the inner cover 151 abutting the battery pack 11 while pressing the inner cover 151 toward the battery pack 11. That is, the retainer 183 has a pressing function of pressing the inner cover 151 downward when the inner cover 151 is in the abutment position. The retainer 183 also has a locking function of locking the inner cover 151 to the battery case 120 when the inner cover 151 is in the abutment position.

The retainer 183 includes the compression spring 61, the first spring seat 62, the second spring seat 63, an operating member 184, and a locked portion 188. Since configurations of the compression spring 61, the first spring seat 62, and the second spring seat 63 of the retainer 183, and the support portion 151*c* of the inner cover 151 that supports the compression spring 61, the first spring seat 62, and the second spring seat 63 are the same as those of the first and second embodiments, the description thereof will be omitted.

Similarly to the retainer 83 of the second embodiment, the retainer 183 of the present embodiment is of a cylindrical cam type. The operating member 184 includes a rotating handle 185 that a user operates with hands, and the rotating shaft 86. The rotating handle 85 of the operating member 84 of the second embodiment has a point-symmetrical shape about the axis C3, whereas in the operating member 184 of the present embodiment, the rotating handle 185 has a shape extending only in one direction from the axis C3. Since the operating member 184 of the retainer 183 and the operating member 84 of the second embodiment have substantially the same configuration except for the shape of the rotating handle 185, the description of the rotating shaft 86 of the operating member 184 is omitted.

Similarly to the second embodiment, the locked portion 188 includes the cylindrical cam 89. Since the locked portion 188 of the retainer 183 has the same configuration as the locked portion 88 of the second embodiment, the description of the locked portion 188 is omitted.

In the present embodiment as well, similarly to the second embodiment, by rotating the rotating handle 185 about the axis C3 when the inner cover 151 is in the abutment position, both locking of the inner cover 151 to the battery case 120 and holding of the inner cover 151 in a state of being pressed downward can be performed at once. When the inner cover 151 is in the abutment position, more specifically, when the rotating handle 185 is rotated while being pressed downward, the locking pin 86*b* is inserted into the engaging hole 89*a* and guided downward spirally to reach a lower end portion (that is, a locking position) of the engaging hole 89*a*. At this time, as shown in FIG. 13, in the present embodiment, the rotating handle 185 is in a state of extending in a left direction from the axis C3. Since the locking pin 86*b* is held at the lower end portion of the engaging hole 89*a*, the inner cover 151 can be locked to the battery case 120 in a state of being pressed downward.

In the present embodiment, as shown in FIG. 12, the outer cover 30 is provided with a protruding member 90 protruding downward from a back surface of the outer cover 30, that is, from the outer cover 30 in a closed position. In the present embodiment, the protruding member 90 is a rod-shaped body attached to the outer cover 30, but the shape of the protruding member is not particularly limited. Although the protruding member 90 interferes with the retainer 183 in a pressing-released state when the outer cover 30 is closed, a protruding position from the outer cover and a length in a protruding direction of the protruding member 90 are adjusted so that the protruding member 90 does not interfere with the retainer 183 in a pressing state. This will be described with reference to FIG. 15.

Figure 15:
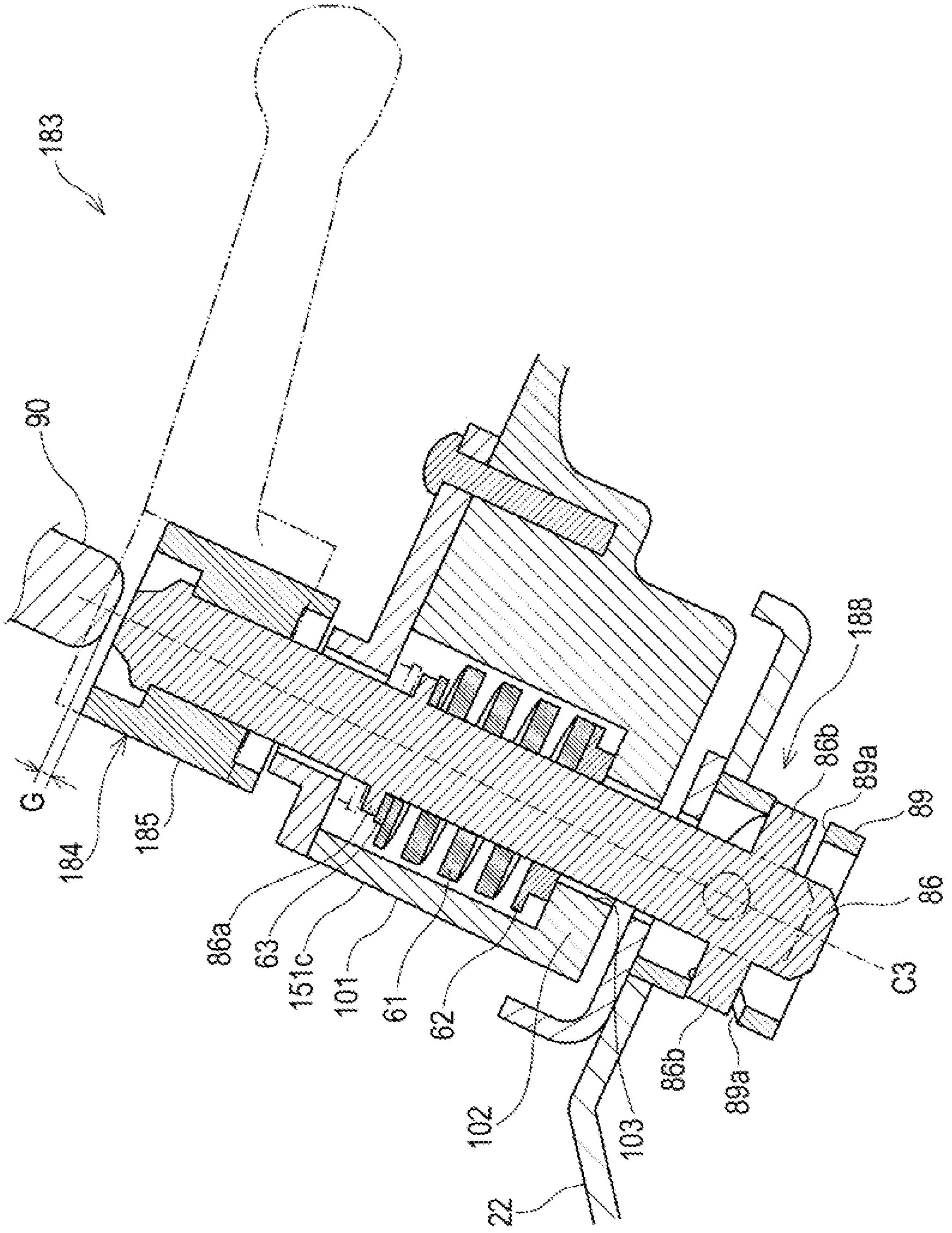
FIG. 15 is a side cross-sectional view showing the vicinity of a retainer in a pressing state in the third embodiment.

FIG. 15 is an enlarged side cross-sectional view showing the vicinity of the retainer 183 in the pressing state in the third embodiment. FIG. 15 also shows a lower end of the protruding member 90 when the outer cover 30 is in a closed position. In the present embodiment, the protruding member 90 is attached to the outer cover 30 such that the protruding member 90 is positioned on the axis C3 of the rotating shaft 86 of the operating member 184 when the outer cover 30 is closed. Since there is a small gap G between the retainer 183 in the pressing state and the protruding member 90 protruding from the outer cover 30 in a closed state, the retainer 183 in the pressing state does not interfere with the protruding member 90.

In FIG. 15, the rotating handle 185 of the retainer 183 in the pressing-released state is indicated by a two-dot chain line. A position of the operating member 184 of the retainer 183 in the pressing-released state is higher than that of the operating member 184 of the retainer 183 in the pressing state, and the operating member 184 of the retainer 183 in the pressing-released state and the protruding member 90 interfere with each other. Therefore, even when the outer cover 30 is pivoted from an open position while the retainer 183 is in the pressing-released state, the interference between the operating member 184 and the protruding member 90 can prevent the outer cover 30 from being closed while the retainer 183 is in the pressing-released state.

As shown in FIG. 15, in the present embodiment, the protruding member 90 is provided on the outer cover 30 so as to interfere with the rotating shaft 86 of the retainer 183 in the pressing-released state, but the protruding member 90 may be provided on the outer cover 30 so as to interfere with other elements of the retainer 183 in the pressing-released state, for example, the rotating handle 185.

In the present embodiment, a lock mechanism 140 for holding the outer cover 30 in the closed position is also different from the lock mechanism 40 described in the first embodiment. Specifically, similarly to the lock mechanism 40 of the first embodiment, the lock mechanism 140 of the present embodiment includes an insertion port 141, a lock moving portion 142, and a lock fixing portion 143. However, the insertion port 141 and the lock moving portion 142 are provided on the outer cover 30 instead of on the base 22. The lock fixing portion 43 is provided on the base 22, more specifically on the upper base frame 23 instead of on the outer cover 30. In this way, by providing the lock moving portion 142, which is a movable portion, on the outer cover 30, a portion of the upper base frame 23 on a front side of the outer cover 30 can be made small, and as a result, the upper opening P1 can be designed to be large. As a result, it is easy to design the upper opening P1 that allows the battery pack 11 and the inner cover 151 to pass therethrough.

Fourth Embodiment

Figure 16:
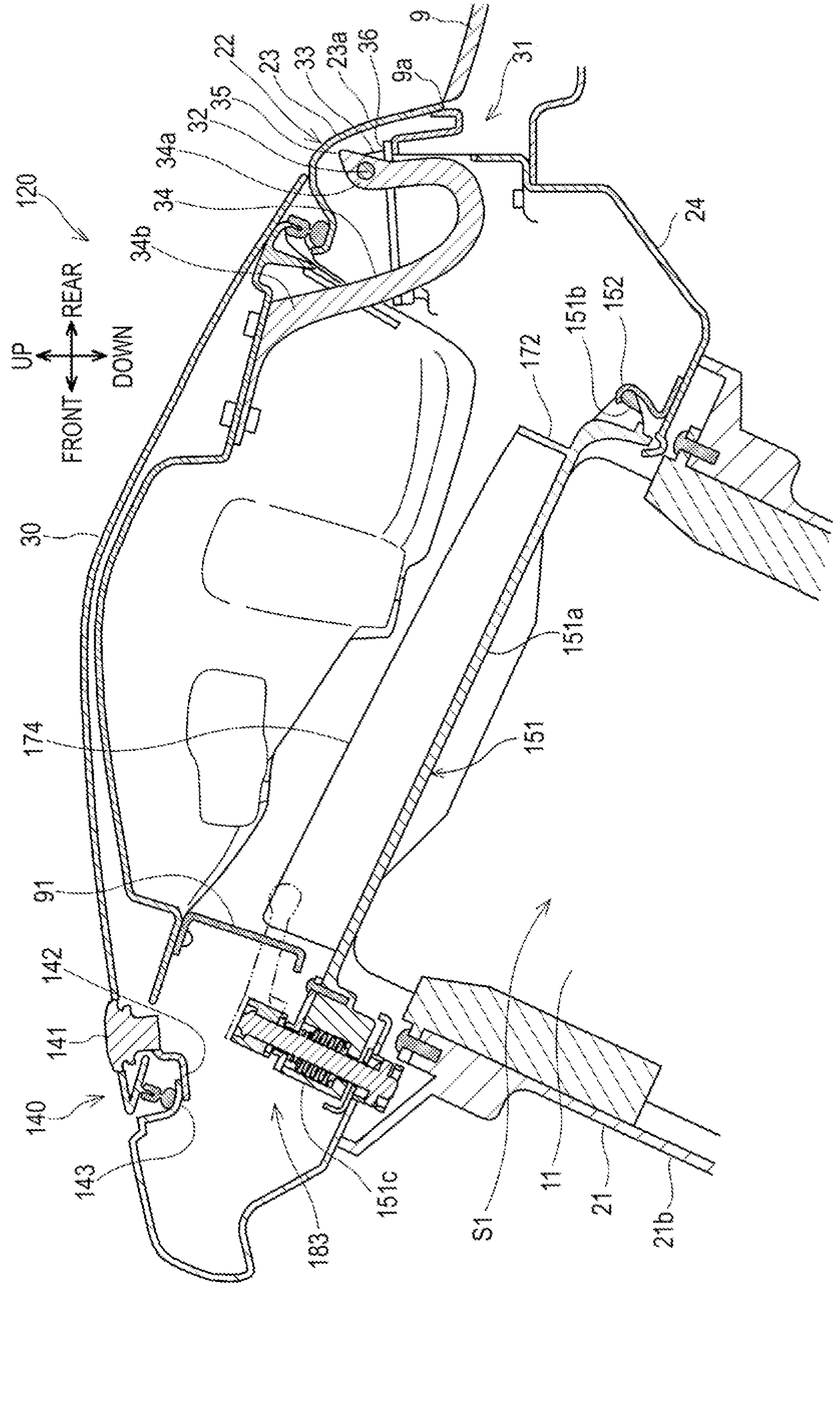
FIG. 16 is an enlarged side cross-sectional view of the vicinity of an upper portion of a battery case of a motorcycle according to a fourth embodiment.
Figure 17:
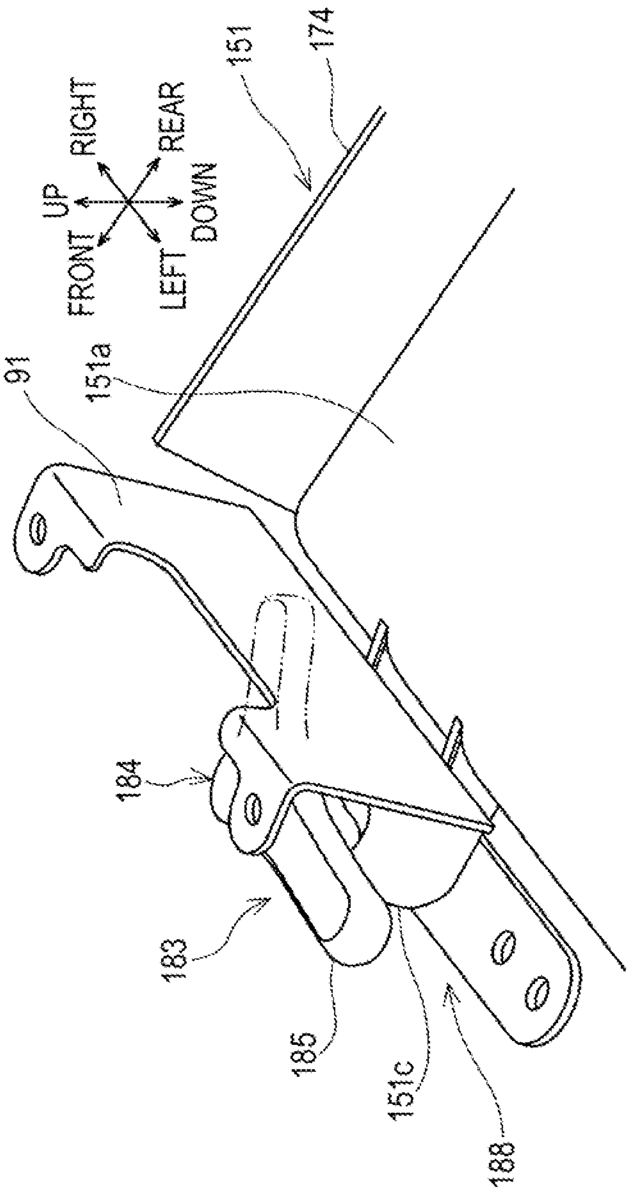
FIG. 17 is an enlarged perspective view showing a part of an accommodation space in the fourth embodiment.

Next, a motorcycle according to a fourth embodiment will be described with reference to FIGS. 16 and 17. In the fourth embodiment, the same components as those of the first to third embodiments are denoted by the same reference numerals, and the description thereof is omitted. FIG. 16 is an enlarged side cross-sectional view of the vicinity of an upper portion of a battery case of the motorcycle according to the fourth embodiment. FIG. 17 is an enlarged perspective view of a part of an accommodation space in the fourth embodiment.

As shown in FIG. 16, in the present embodiment, a partition plate 91 as a protruding member protrudes downward from the outer cover 30 in a closed position. The partition plate 91 interferes with the retainer 183 in a pressing-released state when the outer cover 30 is closed, but a protruding position from the outer cover 30 and a length in a protruding direction of the partition plate 91 are adjusted so that the partition plate 91 does not interfere with the retainer 183 in a pressing state.

Specifically, as shown in FIG. 17, when the retainer 183 is in the pressing state, the rotating handle 185 is in a state of extending in a left direction from the axis C3 (see FIG. 13 as well). That is, when the retainer 183 is in the pressing state, the cover main body 151*a* and the rotating handle 185 do not overlap each other in a top view of the inner cover 151.

On the other hand, the partition plate 91 is provided on the outer cover 30 so as to be positioned directly above a front end portion of the cover main body 151*a*, that is, an end portion of the cover main body 151*a* on a side where the support portion 151*c* is positioned when the outer cover 30 is closed. Therefore, when the outer cover 30 is closed when the retainer 183 is in the pressing state, the partition plate 91 does not interfere with the rotating handle 185.

In FIGS. 16 and 17, the rotating handle 185 of the retainer 183 in the pressing-released state is indicated by a two-dot chain line. When the retainer 183 is in the pressing-released state, the rotating handle 185 is in a state of extending from the axis C3 toward the cover main body 151*a* (see the two-dot chain line in FIG. 13 as well). That is, when the retainer 183 is in the pressing-released state, the cover main body 151*a* and the rotating handle 185 overlap each other in a top view of the inner cover 151. Therefore, in a case in which the outer cover 30 is closed when the retainer 183 is in the pressing-released state, the partition plate 91 interferes with the rotating handle 185.

Therefore, even in a case in which the outer cover 30 is pivoted from an open position when the retainer 183 is in the pressing-released state, the interference between the operating member 184 and the partition plate 91 as a protruding member can prevent the outer cover 30 from being closed when the retainer 183 is in the pressing-released state.

In the present embodiment, in a case in which the outer cover 30 is closed when the retainer 183 is in the pressing state, the partition plate 91 partitions the accommodation space S into a space in which the retainer 183 is disposed and a luggage accommodation space above the cover main body 151*a*. Therefore, the partition plate 91 prevents an accommodation object placed on an upper surface of the cover main body 151*a* from moving forward of the cover main body 151*a*, that is, into the space where the retainer 183 is disposed.

Other Embodiments

The present disclosure is not limited to the above embodiments, and the configuration may be changed, added, or deleted.

For example, in the above embodiments, the straddle-type vehicle is an electric vehicle in which the traveling drive source is an electric motor, but may be a vehicle provided with an engine as the traveling drive source. The battery pack may be a battery pack capable of supplying electric power to an electric motor that assists the engine drive, instead of the traveling drive source. The straddle-type vehicle may be an electrically assisted bicycle that assists human power by an electric motor.

The configuration, posture, and the like of the battery case are not limited to those described in the above embodiments. In the above embodiments, the battery case has a configuration in which the case main body and the base are connected to each other, but the battery case may have a configuration in which the case main body and the base are integrated with each other. For example, in the above embodiments, the base 22 may be only the upper base frame 23, and the lower base frame 24 may be a part of the case main body 21. In this case, the engaging member 52 and the locked portion 68 may be fixed to the case main body 21 instead of the base 22.

In the above embodiments, the base includes the protruding portion, but the base and the protruding portion may be separate from each other.

The pressing mechanism may be an air spring in addition to the compression spring. Alternatively, the pressing mechanism may press the inner cover with a fastener such as a bolt if the inner cover has elasticity. That is, if the inner cover has elasticity, the abutting member itself may be provided with a function of pressing.

The inner cover may include a buffer material at a position where the inner cover abuts the battery pack. In the above embodiments, the abutting member is the inner cover, but the abutting member may not be a cover body that covers the battery pack from above. For example, the abutting member may abut the battery pack instead of closing the lower opening P2. For example, the abutting member may be a rod-shaped member or a mesh-shaped member. The inner cover may not be detachable from the battery case.

The operator of the pressing mechanism is a portion that a user touches with hands when operating the pressing mechanism. A shape, a configuration, and the like of the operator are not limited to those described in the embodiments described above. For example, the operator may be a lever, a handle, a knob, a button, or the like.

The casing as a luggage case includes the partition wall, but the luggage case and the partition wall may be separate from each other.

In the above embodiments, the battery pack 11 accommodated in the first space S1 and the luggage accommodated in the second space S2 are described as accommodation objects accommodated in the accommodation space S or removed from the accommodation space S, but the accommodation objects are not limited thereto. For example, the battery pack may not be included in the accommodation objects. The case in which the accommodation space is formed may not be the battery case, and may be, for example, a case in which only the luggage can be accommodated. For example, the battery pack may not be detachable from the vehicle body. The straddle-type vehicle may be a vehicle that can travel without a battery pack. The straddle-type vehicle may be a vehicle that uses a traveling drive source other than an electric motor, for example, an internal combustion engine. For example, the accommodation object may be an accessory that is worn by a rider during riding, such as a helmet and gloves. The accommodation object may also be a tool box, a manual, or the like, or may be vehicle parts that are detachable from the vehicle body.

DISCLOSURE

Each of the following aspects is a disclosure of preferred embodiments.

First Aspect

A straddle-type vehicle includes: an accommodation space configured to accommodate an accommodation object; a seat disposed behind the accommodation space in a front-rear direction and on which a rider straddles; a hinge shaft disposed above and in front of a front end portion of the seat and extending in a left-right direction; and a cover body pivotable about the hinge shaft between an open position where the accommodation space is opened upward and a closed position where the accommodation space is covered from above.

According to the above aspect, the hinge shaft is disposed above and in front of the seat front end portion. Therefore, when moving the outer cover from the closed position to the open position, it is possible to prevent a pivot range of the outer cover from being restricted by the seat. Accordingly, it is possible to provide a straddle-type vehicle having a cover opening and closing structure that makes it easy to accommodate an accommodation object in the accommodation space or take out the accommodation object from the accommodation space. Since the seat is disposed behind the accommodation space in the front-rear direction, it is not necessary to remove the seat from a vehicle body when accommodating or taking out the accommodation object.

Second Aspect

According to the first aspect of the present disclosure, the straddle-type vehicle may further include: a protruding portion protruding obliquely forward and upward from the front end portion of the seat to restrict a front end position of a seating range of the rider. The hinge shaft may face a surface of the protruding portion facing forward in the front-rear direction.

According to the above aspect, since the hinge shaft serving as a pivot center of the outer cover is disposed in a space covered by the protruding portion, the space covered by the protruding portion can be effectively utilized.

Third Aspect

According to the second aspect of the present disclosure, the straddle-type vehicle may further include: an arm that connects the hinge shaft and the cover body, the arm being pivotable about the hinge shaft together with the cover body. When viewed in the left-right direction, the arm may have a bent shape in which a front end portion of the arm is positioned in front of a front end portion of the protruding portion of a base when the cover body is in the open position.

According to the above aspect, it is possible to prevent the protruding portion which is visible to a user from interfering with the arm.

Fourth Aspect

According to the first or the second aspect of the present disclosure, the hinge shaft may be positioned on a center plane of the straddle-type vehicle in the left-right direction.

According to the above aspect, it is possible to design the protruding portion of the base and the outer cover such that a dimension in the left-right direction is reduced.

Fifth Aspect

According to the third aspect of the present disclosure, the arm may be positioned on a center plane of the straddle-type vehicle in the left-right direction.

According to the above aspect, it is possible to design the protruding portion of the base and the outer cover such that a dimension in the left-right direction is reduced.

Sixth Aspect

According to the first to the fifth aspects of the present disclosure, the straddle-type vehicle may further include: a base having a frame shape, the base including an upper opening closed by the cover body and a lower opening positioned below the upper opening.

According to the above aspect, by forming the base into a frame shape, it is possible to form a passage through which the battery pack passes when the battery pack is accommodated in the battery space or taken out from the battery space.

Seventh Aspect

According to the first to the sixth aspects of the present disclosure, the straddle-type vehicle may further include: a base having a frame shape, the base including an upper opening closed by the cover body in the closed position and a lower opening positioned below the upper opening. The base may include a protruding portion protruding obliquely forward and upward from the front end portion of the seat to restrict a front end position of a seating range of the rider.

Eighth Aspect

According to the sixth or the seventh aspect of the present disclosure, the straddle-type vehicle may further include: a case main body that supports a battery pack which is the accommodation object accommodated in the accommodation space. The base, the hinge shaft, the cover body, and the case main body may be coupled to one another and are unitized as a battery accommodation unit.

According to the above aspect, since the base, the hinge shaft, the outer cover, and the case main body are unitized as the battery accommodation unit, assembly of the straddle-type vehicle is further facilitated. For example, it is easy to adjust positions of the openings of the base with respect to an opening edge of the case main body.

Ninth Aspect

According to the first to the eighth aspects of the present disclosure, the accommodation space may include a battery space occupied by a battery pack which is the accommodation object and a remaining space. The remaining space may include a shaft accommodation space in which the hinge shaft is disposed and a luggage accommodation space for accommodating luggage. The straddle-type vehicle may further include a partition wall that partitions the shaft accommodation space and the luggage accommodation space.

According to the above aspect, the partition wall can prevent the luggage from hitting the hinge shaft and the member supporting the hinge shaft. For example, even if the vehicle body is inclined obliquely forward, the partition wall can prevent the luggage from moving into the shaft accommodation space.

Further, the straddle-type vehicle according to any one of the above aspects 1 to 9 may have the following features.

For example, the straddle-type vehicle may further include a hinge support that supports the hinge shaft, and the base, the hinge shaft, the outer cover, and the hinge support may be unitized as a cover unit. According to the above configuration, since the base, the hinge shaft, the outer cover, and the hinge support are unitized as the cover unit, assembly of the straddle-type vehicle is facilitated.

The cover unit may further include an engaged shaft parallel to the hinge shaft and an inner cover capable of closing the lower opening by pivoting about the engaged shaft. According to the above configuration, since the inner cover is provided, an internal battery space and a space inside the frame-shaped base can be partitioned. Since the inner cover is also a part of the cover unit, assembly of the straddle-type vehicle is facilitated.

The engaged shaft may be disposed in front of the lower opening in the front-rear direction. According to the above configuration, since the engaged shaft serving as a pivot center of the inner cover is positioned in front of the lower opening, it is possible to implement an inner cover opening and closing structure that is less likely to interfere with a pivot structure of the outer cover (for example, the arm connecting the outer cover and the hinge shaft) when the inner cover is pivoted.

The engaged shaft may be fixed to one of the inner cover and the base, and the other of the inner cover and the base may have an engaging structure detachably engaged with the engaged shaft. According to the above configuration, since the battery pack can be accommodated or taken out when the inner cover is removed, attachment and detachment of the battery pack are facilitated.

The battery accommodation unit may be inclined rearward with respect to a vertically upward direction, and a rear end portion of the upper opening of the base may be positioned behind a rear end portion of the opening edge of the case main body. According to the above configuration, since the rear end portion of the upper opening of the base is positioned behind the rear end portion of the opening edge of the case main body, the battery pack can be easily accommodated in the battery accommodation unit inclined rearward with respect to the vertically upward direction.

The straddle-type vehicle described above may further include a protrusion that is disposed around the hinge shaft and pivots together with the outer cover, and a stopper that is disposed around the hinge shaft and abuts the protrusion when the outer cover is in the open position to restrict a pivot range of the outer cover. According to the above configuration, by disposing the structure for restricting the pivot range of the outer cover around the hinge shaft, the space covered by the protruding portion can be effectively utilized.

What is claimed is:

1. A straddle-type vehicle comprising:

an accommodation space configured to accommodate an accommodation object;

a seat disposed behind the accommodation space in a front-rear direction and on which a rider straddles;

a hinge shaft disposed above and in front of a front end portion of the seat and extending in a left-right direction;

a cover body pivotable about the hinge shaft between an open position where the accommodation space is opened upward and a closed position where the accommodation space is covered from above; and a protruding portion protruding obliquely forward and upward from the front end portion of the seat to restrict a front end position of a seating range of the rider, wherein the hinge shaft is disposed in a space covered by the protruding portion, the protruding portion includes a non-exposed portion covered by the cover body in the closed position from above, the straddle-type vehicle further comprises a seal located between the cover body and the non-exposed portion in an up-down direction, and the non-exposed portion has a concave shape such that a portion with which the seal is brought into close contact is recessed downward.

2. The straddle-type vehicle according to claim 1, wherein the hinge shaft faces a surface of the protruding portion facing forward in the front-rear direction.

3. A straddle-type vehicle comprising:

an accommodation space configured to accommodate an accommodation object;

a seat disposed behind the accommodation space in a front-rear direction and on which a rider straddles;

a hinge shaft disposed above and in front of a front end portion of the seat and extending in a left-right direction;

a cover body pivotable about the hinge shaft between an open position where the accommodation space is opened upward and a closed position where the accommodation space is covered from above;

a protruding portion protruding obliquely forward and upward from the front end portion of the seat to restrict a front end position of a seating range of the rider; and an arm that connects the hinge shaft and the cover body, the arm being pivotable about the hinge shaft together with the cover body, wherein the hinge shaft faces a surface of the protruding portion facing forward in the front-rear direction, and when viewed in the left-right direction, the arm has a bent shape in which a front end portion of the arm is positioned in front of a front end portion of the protruding portion when the cover body is in the open position.

4. The straddle-type vehicle according to claim 1, wherein the hinge shaft is positioned on a center plane of the straddle-type vehicle in the left-right direction.

5. The straddle-type vehicle according to claim 3, wherein the arm is positioned on a center plane of the straddle-type vehicle in the left-right direction.

6. The straddle-type vehicle according to claim 3, further comprising:

a base having a frame shape, the base including an upper opening closed by the cover body and a lower opening positioned below the upper opening.

7. The straddle-type vehicle according to claim 3, further comprising:

a base having a frame shape, the base including an upper opening closed by the cover body in the closed position and a lower opening positioned below the upper opening, wherein the base includes a protruding portion protruding obliquely forward and upward from the front end portion of the seat to restrict a front end position of a seating range of the rider.

8. The straddle-type vehicle according to claim 6, further comprising:

a case main body that supports a battery pack which is the accommodation object accommodated in the accommodation space, wherein the base, the hinge shaft, the cover body, and the case main body are coupled to one another and are unitized as a battery accommodation unit.

9. The straddle-type vehicle according to claim 3, wherein the accommodation space includes a battery space occupied by a battery pack which is the accommodation object and a remaining space, the remaining space includes a shaft accommodation space in which the hinge shaft is disposed and a luggage accommodation space for accommodating luggage, and the straddle-type vehicle further includes a partition wall that partitions the shaft accommodation space and the luggage accommodation space.

10. The straddle-type vehicle according to claim 3, wherein the hinge shaft is disposed in a space covered by the protruding portion, and in the space of the protruding portion, the cover body and the arm are configured to rotate around the hinge shaft.

11. The straddle-type vehicle according to claim 9, wherein the remaining space is arranged above the battery space, and the shaft accommodation space is arranged behind the luggage accommodation space with respect to the partition wall.

12. The straddle-type vehicle according to claim 3, wherein the protruding portion extends to a position forward of the hinge shaft.

13. The straddle-type vehicle according to claim 3, wherein the arm includes the front end portion and a rear end portion located separately with each other.

14. The straddle-type vehicle according to claim 3, wherein the protruding portion includes a non-exposed portion covered by the cover body in the closed position from above, the straddle-type vehicle further comprises a seal located between the cover body and the non-exposed portion in an up-down direction, and the non-exposed portion has a concave shape such that a portion with which the seal is brought into close contact is recessed downward.

* * * * *